United States Patent [19]
Reinders

[11] Patent Number: 5,735,997
[45] Date of Patent: Apr. 7, 1998

[54] DEVICE FOR MOUNTING, LAMINATING AND/OR ENCLOSING AN ILLUSTRATION, AND A CASSETTE FOR SUCH A DEVICE

[76] Inventor: Johannes Antonius Maria Reinders, De Braak 2, NL-8101 GJ Raalte, Netherlands

[21] Appl. No.: 564,367

[22] PCT Filed: Jun. 21, 1994

[86] PCT No.: PCT/NL94/00146

§ 371 Date: Mar. 22, 1996

§ 102(e) Date: Mar. 22, 1996

[87] PCT Pub. No.: WO95/00430

PCT Pub. Date: Jan. 5, 1995

[30] Foreign Application Priority Data

| Jun. 21, 1993 | [NL] | Netherlands | 9301078 |
| Dec. 10, 1993 | [NL] | Netherlands | 9302157 |
| Dec. 10, 1993 | [NL] | Netherlands | 9302158 |
| Dec. 10, 1993 | [NL] | Netherlands | 9302159 |
| Dec. 10, 1993 | [NL] | Netherlands | 9302160 |

[51] Int. Cl.$^6$ ............................................. B32B 31/00
[52] U.S. Cl. ...................... 156/495; 156/498; 156/522; 156/555; 156/583.1
[58] Field of Search ............................ 156/494, 495, 156/522, 555, 583.1, 498; 100/327, 330, 334, 176

[56] References Cited

U.S. PATENT DOCUMENTS

| 2,017,200 | 10/1935 | Beck | 156/301 |
| 2,668,572 | 2/1954 | Bostwick | 156/555 |
| 3,623,933 | 11/1971 | Staats | 156/552 |
| 3,840,420 | 10/1974 | Sarcia | 156/358 |
| 4,226,664 | 10/1980 | Shaffer | 156/499 |
| 4,353,776 | 10/1982 | Giulie et al. | 156/555 |
| 5,316,609 | 5/1994 | Guither et al. | 156/301 |
| 5,356,507 | 10/1994 | Wojtanowitsch et al. | 156/555 |
| 5,368,677 | 11/1994 | Ueda et al. | 156/362 |
| 5,480,509 | 1/1996 | Matsuo et al. | 156/522 |
| 5,580,417 | 12/1996 | Bradshaw | 156/495 |
| 5,584,962 | 12/1996 | Bradshaw et al. | 156/495 |

FOREIGN PATENT DOCUMENTS 1238192  4/1967  Germany.

*Primary Examiner*—James Sells
*Attorney, Agent, or Firm*—Webb Ziesenheim Bruening Logsdon Orkin & Hanson, P.C.

[57] ABSTRACT

The invention relates to a device for mounting, laminating and/or enclosing an illustration, comprising a housing having a mounting and laminating unit located in the housing.

39 Claims, 17 Drawing Sheets

DEVICE FOR MOUNTING, LAMINATING AND/OR ENCLOSING AN ILLUSTRATION, AND A CASSETTE FOR SUCH A DEVICE

BACKGROUND OF THE INVENTION

The present invention relates to a device for mounting, laminating and/or enclosing an illustration, whereby such an illustration can be more easily handled, protected and/or presented. The present invention moreover relates to a cassette for such a device, so that by changing cassettes different cover foils and/or enclosing foils can be used at choice with such a device without too much difficulty.

Understood by mounting in the present invention is the arranging of an illustration on a substrate, wherein the illustration generally lies freely on the substrate. The illustration is herein adhered to the substrate by means of a glue layer. The substrate can consist in this case of a rigid material such as optionally water-resistant cardboard, a foam plate, a plate of polystyrene or polymethacrylate which is optionally transparent, so that in this case the illustration is visible through the transparent underlayer. The glue to be used can consist of a double-sided adhering foil, a hot melt applied to a silicon paper or a sheet of plastic such as polyethylene which serves both as foil and glue.

Understood by laminating in the present invention is the application of a covering layer over the illustration which is provided in advance or simultaneously with a substrate. This means that the illustration is protected by the covering layer and is usually visible through the covering layer.

The covering or enclosing foil usually consists of a layer provided with a glue layer. This layer can consist of polypropylene, polyvinylchloride, polyester and the like, while the glue can consist of a plastic such as polyethylene, an acryl dispersion, an acryl solution, which glue can be a heat-sensitive or pressure-sensitive glue. In the case of a pressure-sensitive glue this glue layer is often temporarily provided with a protective sheet.

In the case of laminating a substrate can be used which is the same as is used in the case of mounting.

Understood by enclosing in the present patent application is simultaneously providing the illustration on both sides with an enclosing foil. These foils are generally very thin materials and can in principle be the same materials as are used for cover foil during lamination.

It is noted that the materials which are used for mounting, laminating and enclosing are in principle from the prior art and the device according to the invention has been developed such that such existing material is can be used during mounting, laminating and/or enclosing.

The illustration which is processed in the device according to the tale invention can consist of a drawing, a photo, but will usually consist of illustrations produced with printers, in particular colour printers, which generate illustrations which cannot be distinguished, or hardly so, from the illustrations obtained via photographic processes. Equipment for producing such illustrations, in particular the colour printers, is becoming increasingly cheaper so that producing such illustrations is also becoming more and more accessible for the non-professional market. There therefore exists a need for devices likewise suitable for the non-professional sector for mounting, laminating and/or enclosing such illustrations. One condition, however, is that the operation of such devices must be possible by non-professional users, while the costs must be adapted to those of for instance colour printers for producing illustrations.

With such a device it is therefore possible for non-professional users to be able to rapidly produce illustrations which, after mounting on a substrate, after lamination and/or enclosing, can be directly used in stores, factories and as advertising material for indoors as well as outdoors.

SUMMARY OF THE INVENTION

The present invention has for its object to provide a device which meets the above stated requirements for mounting, laminating and/or enclosing an illustration. According to a first aspect, the present invention is based on the insight that for the mounting, laminating and enclosing not three separate devices are required but that these devices can be integrated into a single device. It is thus possible for the user to be able to mount, laminate and enclose an illustration with a single device. The device according to the invention is optimally suitable for use if this device can be used by the user from one side.

The present invention therefore relates to a device for mounting, laminating and/or enclosing an illustration which comprises a housing and, accommodated in the housing, a mounting and-laminating unit and an enclosing unit, wherein an inlet for the mounting and laminating unit and the enclosing unit are accessible from one side of the housing.

In order to make it possible for the user to use different substrates, cover foils and enclosing foils for different illustrations in order to realize any desired affect, it is recommended that the mounting and laminating unit comprises an entry table which connects onto the inlet and which connects onto a covering roller pair consisting of an upper covering roller and a lower covering roller and a cover layer cassette for delivering a cover foil to a covering roller and/or it is recommended that the enclosing unit comprises an entry table which connects onto the inlet and which connects onto an enclosing roller pair consisting of an upper enclosing roller and a lower enclosing roller and two enclosing cassettes for delivering an enclosing foil to the respective enclosing roller, and a subsequent pair of stretching rollers for stretching therebetween the enclosing foils arranged on the illustration. All types of cover foils and enclosing foils can be used by changing the cassettes. A very favourable device according to the invention results when in further preference a roller is displaceable between the mounting and laminating unit and the enclosing unit and functions as covering roller and as stretching roller. This is based on the fact that for the mounting/laminating unit only one heated or pressure roller can be used, so that the other covering roller can consist of the enclosing roller. No problems herein occur in respect of cooling of an enclosing roller if it is also to be used as covering roller. All the above implies that successive mounting/laminating and enclosing can take place without any waiting time having to be taken into account. All that is required is the displacing of the covering roller/stretching roller from the mounting/laminating unit to the enclosing unit and vice versa. In this respect it is recommended that the enclosing rollers and one of the covering rollers are provided with heating means and/or pressure means.

In the case that a foil is supplied from the cassette which is provided with a heat-activated glue layer, it is recommended to cause this glue layer to travel the longest possible path over the roller surface. A larger heat-exchanging surface is thus created, more heat-exchanging contact time is possible, whereby the roller could have a lower temperature or can operate at a higher speed. It is therefore recommended that a cassette outlet connects onto a roller point which lies along the roller surface at more than 200° from the entry table. More preferably connection is made to a roller point which lies at more than 220°, preferably more than 240°, from the entry table.

For optimum exchange of cassettes by the user it is further recommended that the cassette is slidable via an infeed into a cassette holder.

In the case that with the device according to the invention illustrations are mounted, laminated and/or enclosed with variable widths and associated variation in the width for the cover foil and the enclosing foil, it is further recommended to use cassettes of different lengths. In that case it is possible to use cassette attachments which, in the case of a smaller cassette length, are pushed with the cassette on either side thereof into the cassette holder so that operation can take place continuously in the central longitudinal plane of the device according to the invention.

Furthermore, the present invention relates to a cassette which is used with the device according to the invention for mounting, laminating and/or enclosing the illustration with the features as described above.

According to a second aspect, the present invention is based on the insight that three separate devices are not required for the mounting, laminating and enclosing and use can only be made of a mounting and laminating unit and an enclosing unit which each contain only one roller pair if one roller of each roller pair is provided with heating means. A pair of stretching rollers following on from the laminating unit can thus be omitted or-a shifting roller can be omitted.

This is achieved according to the invention by a device for mounting, laminating and/or enclosing an illustration comprising a housing and, accommodated in the housing, a mounting and laminating unit and an enclosing unit, which each comprise a pair of rollers located on either side of a through-feed plane along which the illustration passes, wherein one roller of each roller pair is provided with heating means.

In the device according to the invention the enclosing unit is deactivated when the mounting unit is used, for instance by moving the rollers out of the through-feed plane such that no contact is made with the passing illustration.

According to a preferred embodiment the mounting and laminating unit comprises a covering roller pair with an Upper covering roller and a lower covering roller and the upper covering roller is provided with the heating means so that the illustration can be mounted on its substrate in simple manner.

According to a preferred embodiment the enclosing unit comprises an enclosing roller pair with an upper enclosing roller and a lower enclosing roller and the lower enclosing roller is provided with the heating means so that, in the case of enclosing, heated rollers are located on both sides of the through-feed plane.

When the enclosing rollers are adjustable relative to each other the mounting and laminating unit and the enclosing unit are adjustable subject to the thickness of the illustration and of its substrate/foils.

If the enclosing roller provided with the heating means is adjustable in and out of the through-feed plane the advantage is achieved that when the enclosing unit is not in use, by swinging aside the enclosing roller provided with heating means foil is not used in undesired manner.

If foil is supplied from a cassette to the heated roller and cutting means are located in the processing direction subsequent to this heated roller, a smaller amount of waste foil is produced.

The mounting and laminating unit and the enclosing unit can be positioned very closely to each other if in further preference cooling means are located in the processing direction subsequent to the covering roller pair so that a previously softened and arranged foil acquires sufficient strength before the following softened foil is arranged. It is further advantageous herein that a cassette connects onto the roller provided with the heating means for supplying foil to this roller and the foil is guided round a deflecting roller, whereby the distance between the mounting and laminating unit and the enclosing unit is smaller than the space which would have to be occupied by the cassette.

For rapid insertion of another cassette and deflecting of its foil it is further recommended that the cassette is fixed to a fork coupled to the roller and the deflecting roller.

According to a third aspect, the present invention is based on the insight that the number of rollers used in the mounting and laminating unit and the enclosing unit can be limited by making use of a displaceable roller between the mounting and laminating unit and the enclosing unit, while successive operations can nevertheless be performed in both units without any waiting time having to be taken into account with respect to heating or cooling of the displaceable roller.

This is achieved according to the invention with a device for mounting, laminating and/or enclosing an illustration, comprising a housing and, accommodated in the housing, a mounting and laminating unit and an enclosing unit, wherein the mounting and laminating unit comprises a pair of covering rollers and the enclosing unit comprises two enclosing rollers and two stretching rollers and wherein a roller is displaceable between the mounting and laminating unit and the enclosing unit.

Both enclosing rollers and both stretching rollers are in principle suitable as displaceable roller. Preference is given to the stretching rollers because these stretching rollers are not provided with heating means, and to the covering roller which is likewise not provided with heating means, According to a first embodiment the stretching roller is displaceable between a position in which it makes contact with the covering roller and a position in which it makes contact with the other stretching roller, wherein in preference the displaceable stretching roller is the upper stretching roller in the case the mounting and laminating unit is arranged above the enclosing unit. In the reverse situation use is preferably made of the lower stretching roller.

According to another embodiment the stretching roller is displaceable between a position in which it makes contact with the other stretching roller and another position in which it makes no contact with the other stretching roller. In this case the other stretching roller is in continuous contact with the associated covering roller, while when an operation is performed in the enclosing unit the other stretching roller must be placed in contact with the one etc. etching roller in order to be able to carry out stretching. When the enclosing unit is located beneath the mounting and laminating unit it is recommended to use the lower stretching roller as displaceable stretching roller; in the reverse situation it is recommended to use the upper stretching roller.

According to yet another embodiment the stretching rollers each co-act with an enclosing roller and the displaceable stretching roller is displaceable between a position in which it makes contact with the covering roller and a position in which it makes contact with the enclosing roller.

According to a fourth aspect, the present invention is based on the insight that when the through-feed directions for the mounting and laminating unit and for the enclosing unit do not run parallel, a device results with which mounting and laminating operations as well as enclosing operations can be simultaneously performed, while waiting time associated with the switch-over between both types of operation (cooling of rollers) is avoided. The device according to the invention for mounting, laminating and/or enclosing an illustration is therefore characterized in that it comprises a housing and, accommodated in the housing, a mounting and laminating unit and an enclosing unit, wherein the through-feed direction of the mounting and laminating unit and the through-feed direction of the enclosing unit lie at a mutual angle.

If in further preference the through-feed directions are opposed, the mounting and laminating operations can be performed from one side and the enclosing operations from the other side, while the users of the device do not impede each other herein. In addition, the above factors can result in a device that is very compact in height direction.

If according to another preferred embodiment both through-feed directions lie transversely of each other, more preferably the through-feed direction of the mounting and laminating unit is substantially horizontal and the through-feed direction of the enclosing unit is substantially vertical, an apparatus results of reduced surface area and which is extended more in height direction and which can thus in principle be placed on a base.

According to a fifth aspect, the present invention is based on the insight that adapting such a device to the user, for instance in respect of the location of the inlets and outlets for the mounting and laminating unit and enclosing unit, as well as the use of particular foils and the thereby necessary foil temperatures, can be optimally designed if the roller pair for the mounting and laminating unit and the enclosing unit consist of a heated roller and an unheated roller. This is achieved according to the invention with a device for mounting, laminating and/or enclosing an illustration, comprising a housing and, accommodated in the housing, a mounting and laminating unit and an enclosing unit which each comprise roller pairs which consist of a roller provided with heating means and a co-acting, unheated roller.

With respect to the enclosing unit this means that each roller pair is now made up of a heated enclosing roller and an unheated stretching roller. This implies that for the mounting/laminating unit and for the enclosing unit at least six rollers are necessary.

The number of rollers can be further reduced if in preference an unheated roller is a roller which is displaceable between a roller pair of the mounting and laminating unit and of the enclosing unit. It is highly favourable if the displaceable roller functions as covering roller in the mounting and laminating unit and as stretching roller in the enclosing unit.

If the through-feed for the mounting/laminating unit and for the enclosing unit must take place from one side in accordance with the choice of the user, it is further recommended that the displaceable roller is provided with means for reversing the rotational direction of the roller. Use can be made of a displaceable roller despite insertion from one side for both the units.

Mentioned and other features of the device and cassette according to the invention will be further elucidated hereinbelow on the basis of a number of embodiments only given by way of example and to which reference is made in the annexed drawings.

DESCRIPTION OF THE PREFERRED EMBODIMENTS

Figure 1:
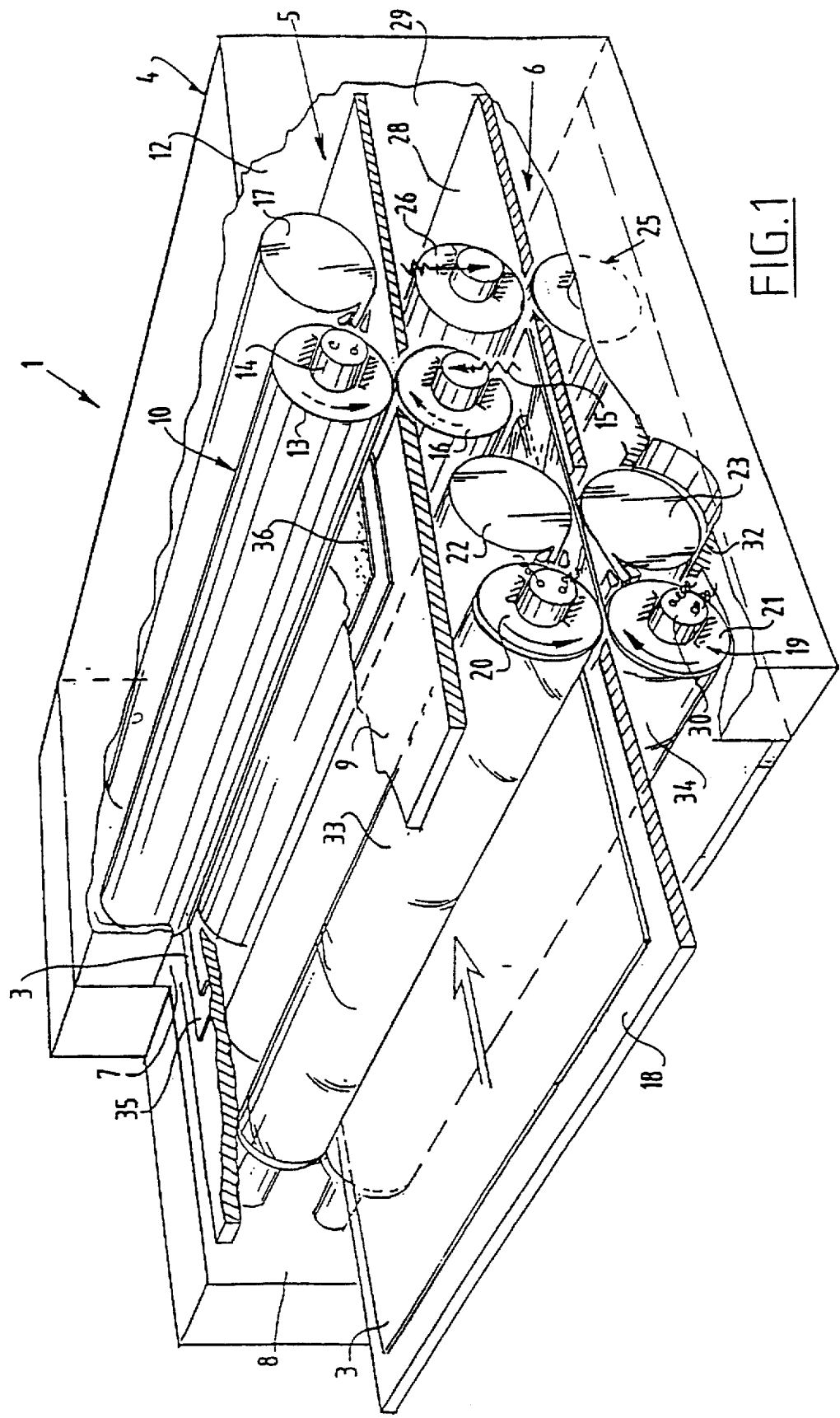
FIGS. 1 and 2 each show a schematic, partly broken away perspective view of devices according to the invention.

FIG. 1 shows a device I according to the invention for mounting, laminating and/or enclosing an illustration 3. The device 1 comprises a housing 4 in which are accommodated a mounting and laminating unit 5 and an enclosing unit Both units 5 and 6 are arranged one above the other in housing 4, while an inlet 7 for the mounting and laminating unit 5 and an inlet 8 for the enclosing unit 6 are accessible from the same side of housing 4.

The mounting and laminating unit 5 comprises an entry table 9 connecting onto the inlet 7 and subsequent thereto a covering roller pair 10 and thereafter a discharge table 11 for discharge to an outlet 12.

The covering roller pair 10 comprises an upper covering roller 13 which is provided with heating means 14 and a lower covering roller 16 co-acting therewith under bias of spring means 15.

A cassette 17 is placed behind the upper covering roller 13 for feeding a cover foil to covering roller 13.

The construction of cassette 17 will be discussed hereinafter with reference to FIGS. 3 and 4.

The enclosing unit 6 comprises an entry table 18 connecting onto the inlet 8 and subsequent thereto an enclosing roller pair 19 comprising an upper enclosing toiler 20 and a lower enclosing roller 21, each with an associated cassette 22, 23 for enclosing foil. Following on from an intermediate table 24 in the processing direction is a stretching roller pair 25 consisting of an upper stretching roller 26 and a lower stretching roller 27, and finally a discharge table connecting onto outlet 29.

Both enclosing rollers 20 and 21 are each provided with heating means 30.

It can be seen clearly that via an inlet 31 the cassette 23 is slidable into a cassette holder 32.

The operation of the device 1 is as follows: The illustration 3, for instance an electronically produced colour print, is supplied on the entry table 18 to the enclosing rollers 20, 21, over which enclosing foil 33, 34 is supplied from the enclosing cassettes 22 and 23. Because the enclosing rollers 20, 21 are heated to for example 120° C., the glue of the enclosing foils will soften and adhere to both sides of the illustration 3 which passes between the enclosing roller pair 19, whereafter the enclosing foil is pulled taut on both sides using the stretching roller pair 25. An illustration 3 wholly enclosed in enclosing foil is made available via outlet 29.

Separately or simultaneously the user can for instance in this case mount another illustration 3 in the mounting and laminating unit 5. For this purpose the illustration 3 is placed on a substrate 35, for instance water-resistant cardboard, to which the illustration 3 is mounted by adhesion via a heat-activated glue layer 36 which is activated when the whole entity passes between the covering roller pair 10, wherein the heated covering roller 13 activates the glue layer 36 through the illustration 3. In this case no cover foil is supplied from cassette 17. An illustration 3 mounted on a substrate 35 is thus made available at the outlet 12.

It is noted that instead of heated covering rollers and enclosing rollers pressure rollers can be used, in which case foils are used with pressure-activated film layers.

Figure 2:
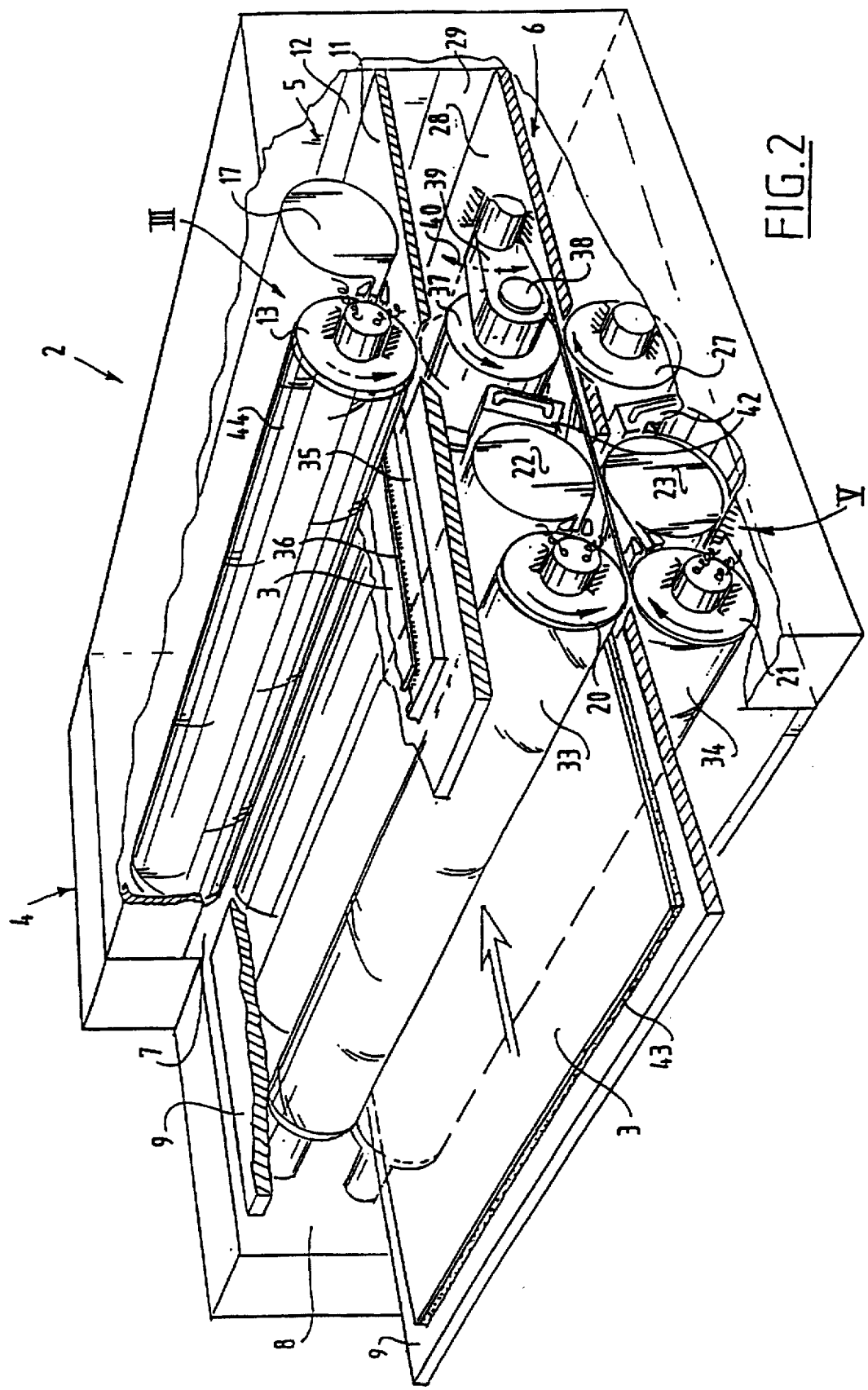

FIG. 2 shows a device 2 according to the invention having substantially the same construction as the device 1 of FIG. 1. In this case a mounting/laminating unit 5 and an enclosing unit 6 are also accommodated in the housing 4.

Characteristic of the device 2 according to the invention is that a roller 37 can co-act with both the covering roller 13 of the mounting and laminating unit and the stretching roller 27 of the enclosing unit 6. For this purpose the roller 37 is mounted with a shaft 38 in a crank 39 which is displaceable as according to the double arrow 40 via the control shaft 41 between the position shown in full lines and the position shown with dashed lines. The roller 37 thus functions either as covering roller or as stretching roller.

The enclosing unit 6 further comprises cooling elements 42 placed behind the cassettes 22 and 23 for accelerated cooling of the enclosing foils 33 and 34 which are arranged on an illustration 3 during enclosing.

Subsequently, after displacing of roller 37 to the mounting/laminating unit 5, an illustration 3 lying on a substrate 35 via the glue layer 36 can be laminated in that a cover foil 44 supplied from the cassette 17 is laminated over the illustration 3, wherein the heat-sensitive glue layer is also activated by the covering roller 13.

Figure 3:
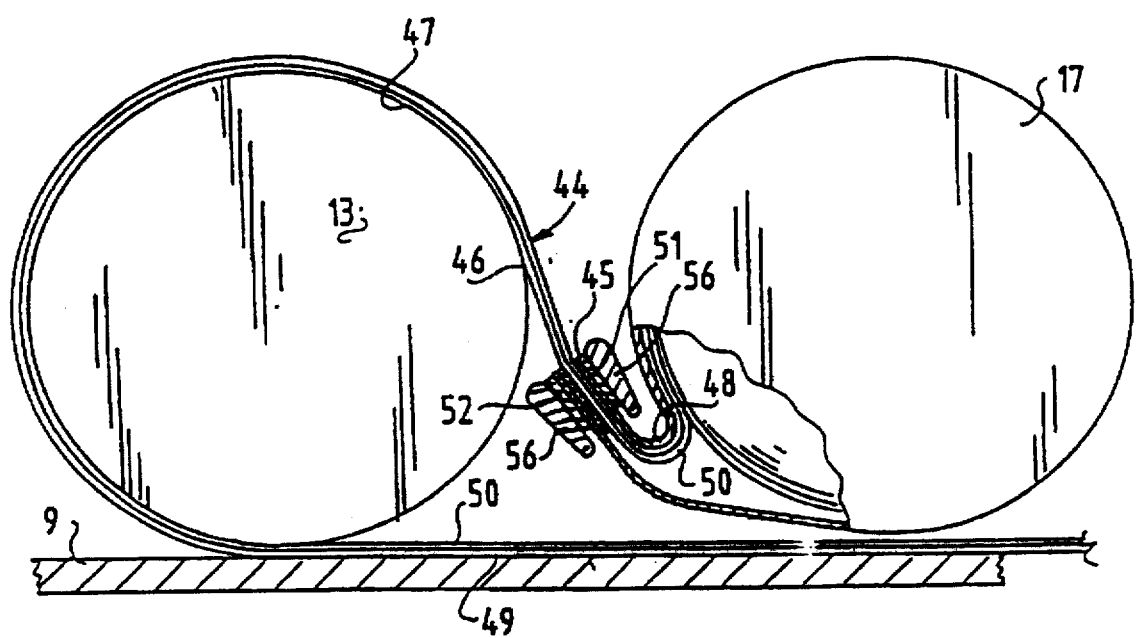
FIG. 3 shows on a larger scale and partly broken away a side view according to III in FIG. 2.

FIG. 3 shows the construction of a cassette 17 according to the invention as described for feeding a cover foil 44 to the heated covering roller 13. Cassette 17 comprises a slit-like cassette outlet 45 which connects onto a roller 46 which lies along the roller surface 47 at more than 200° from the entry table 9.

The cassette 17 is further provided with a stationary deflecting member 48 around which the cover foil 44 is deflected while the deflecting member 48 makes contact with the glue layer 49 so that at that position the scratch-sensitive layer 50 which forms the final covering layer laid free for the first time.

Further acting on the outlet 45 are bending means in the form of bending strips 51 and 52, whereby the cassette outlet 45 acquires in lengthwise direction a curved form as according to the dashed lines 53 and 54 (FIG. 4) and in addition adjustable pressure strips 55, 56 with which the foil sheet tension can be regulated.

Finally, a felt cushion 57 is mounted in the cassette 35 outlet 45 whereby scratch-forming on the scratch-sensitive layer 50 is avoided.

Figure 4:
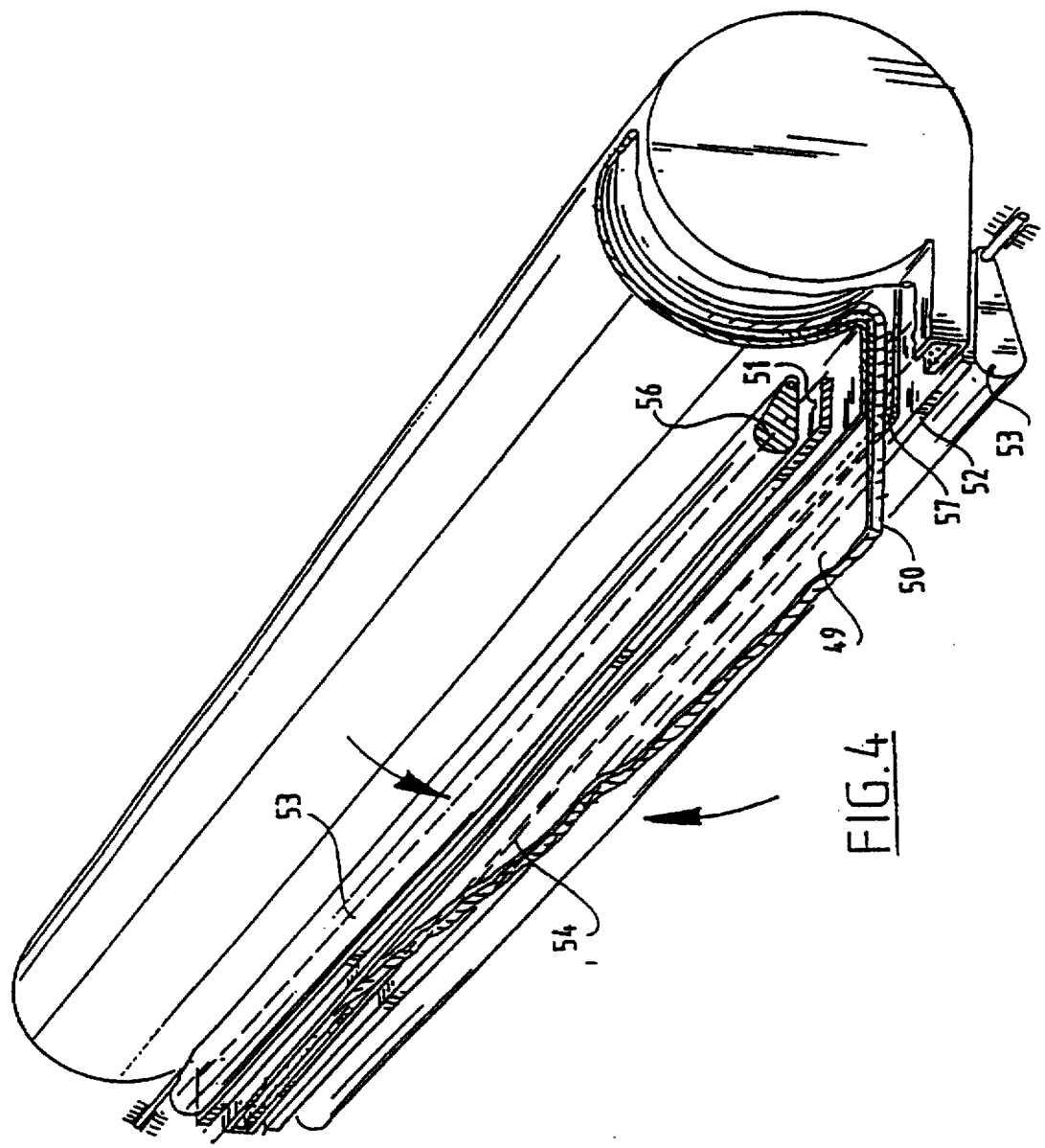
FIG. 4 shows in side view a cassette according to the invention placed in the cassette holder of a device according to the invention.

The construction of cassette 17 as described in FIGS. 3 and 4 applies also to the other cassettes according to the invention.

Figure 5:
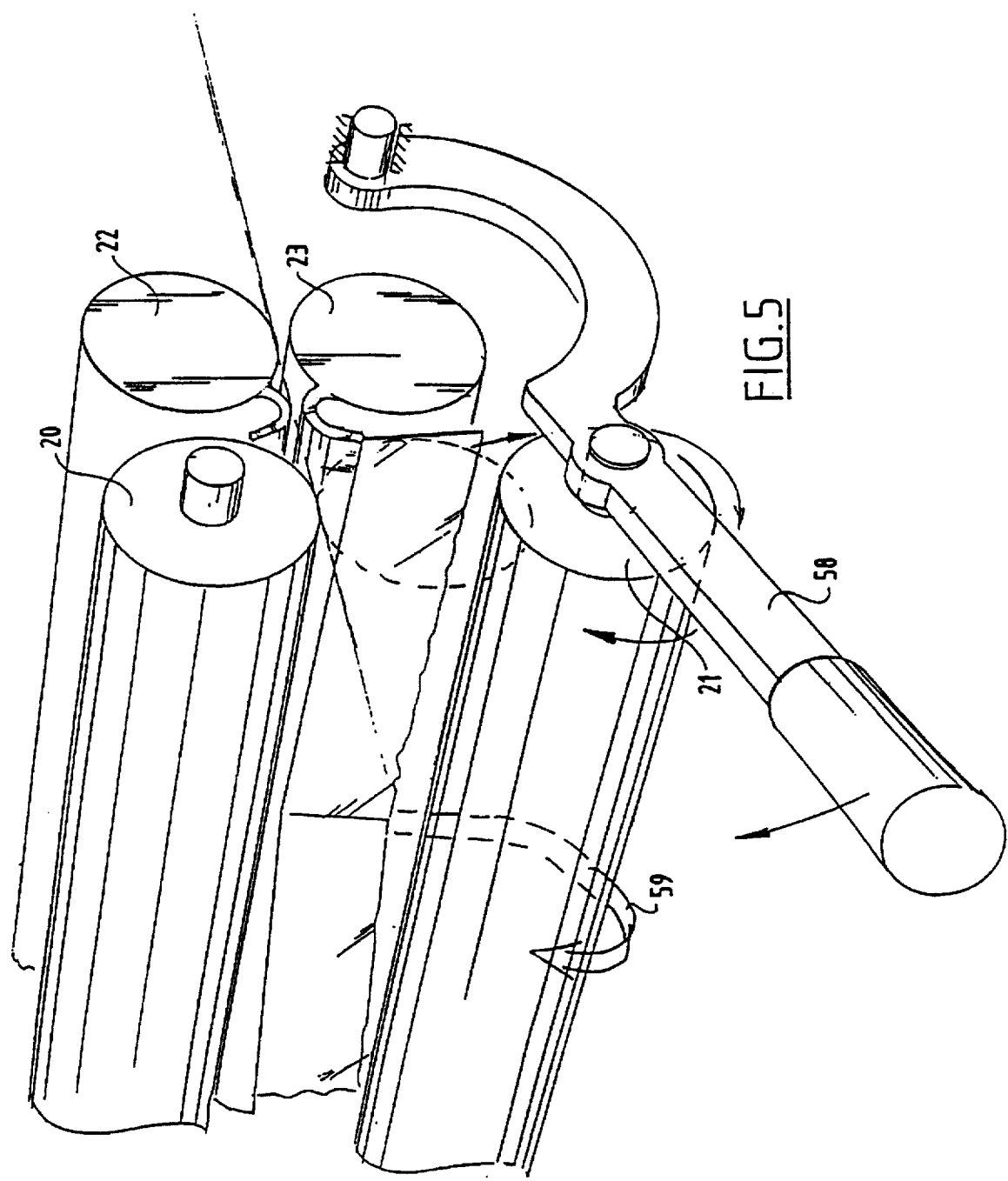
FIG. 5 shows a variant of detail IV in FIG. 2.

FIG. 5 shows a variant of the devices 1 and 2 according to the invention for the enclosing roller pair 19 consisting of the enclosing rollers 20 and 21. In this case the lower enclosing roller 21 is mounted in an outward swingable roller bracket 58. By swinging away the enclosing roller 21 the nip between both covering rollers 20 and 21 is enlarged, whereby cover foil from cassettes 22 and 23 can be more easily guided round both covering rollers 21 and 22, as shown via arrow 59. It is thus possible to easily exchange cassettes 22 and 23 for similar cassettes with other types of enclosing foil.

Figure 6:
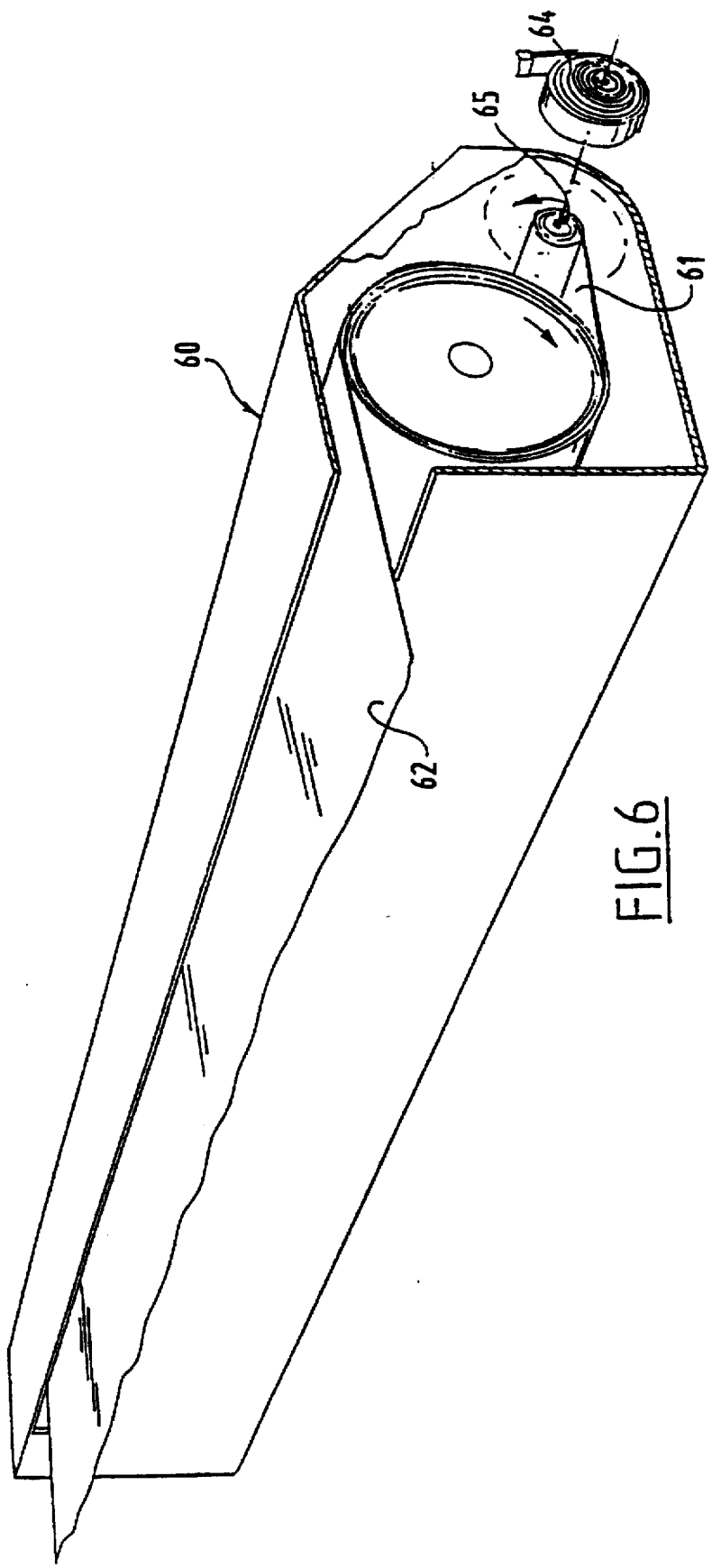
FIG. 6 shows another cassette according to the invention having arranged therein pressure-sensitive foil, wherein unwound protective layer is wound up again.

Finally, FIG. 6 shows another cassette 60 according to the invention. Rolled up in cassette 60 in this case is a pressure-sensitive enclosing foil or cover foil 62, a protective foil layer 61 of which is unwound and taken up onto a shaft 65 under bias of a spiral spring 64.

It will be apparent that with the device and the cassette according to the invention all kinds of enclosing and cover foils as well as substrates can be used, as known and applicable in the prior art. Characteristic for the device is the combined use Of a mounting and laminating unit and an enclosing unit in one device, while the cassette is easily exchangeable and is substantially characterized by its simple and adequate construction.

The cassette preferably has a construction in which mechanically moving parts are omitted as far as possible. For an optimum supply of foil to a roller under the most constant possible sheet pressure it is therefore recommended that the cassette is provided with a stationary deflecting member.

In order to supply the sheet foil from the cassette to the roller in as straight a line as possible it is recommended that the cassette outlet has a curved form in lengthwise direction. By making use of this curved form the foil sheet will continually seek the optimal centred position. When a cassette must have the simplest possible form but the cassette outlet must nevertheless have a curved form, it is further recommended that the housing be provided with bending means for bending the cassette outlet into the curved form.

With the use of the cover foils and enclosing foils the top layer has to be free of damage such as scratches and the like. Such damage is permissible on the glue layer, since through contact with the heated roller the glue layer will fuse and this damage will disappear. Since the foil also has to be deflected when it leaves the cassette it is therefore recommended that the foil rolled up in the cassette is a laminate foil whereof the scratch-sensitive layer is wound facing inward. The scratch-sensitive layer does not therefore come into contact with the deflecting member.

For easy exchanging of foils which therein must be arranged between a roller pair it is further recommended that at least one roller of a roller pair is mounted on a swing-away roller bracket.

Figure 7:
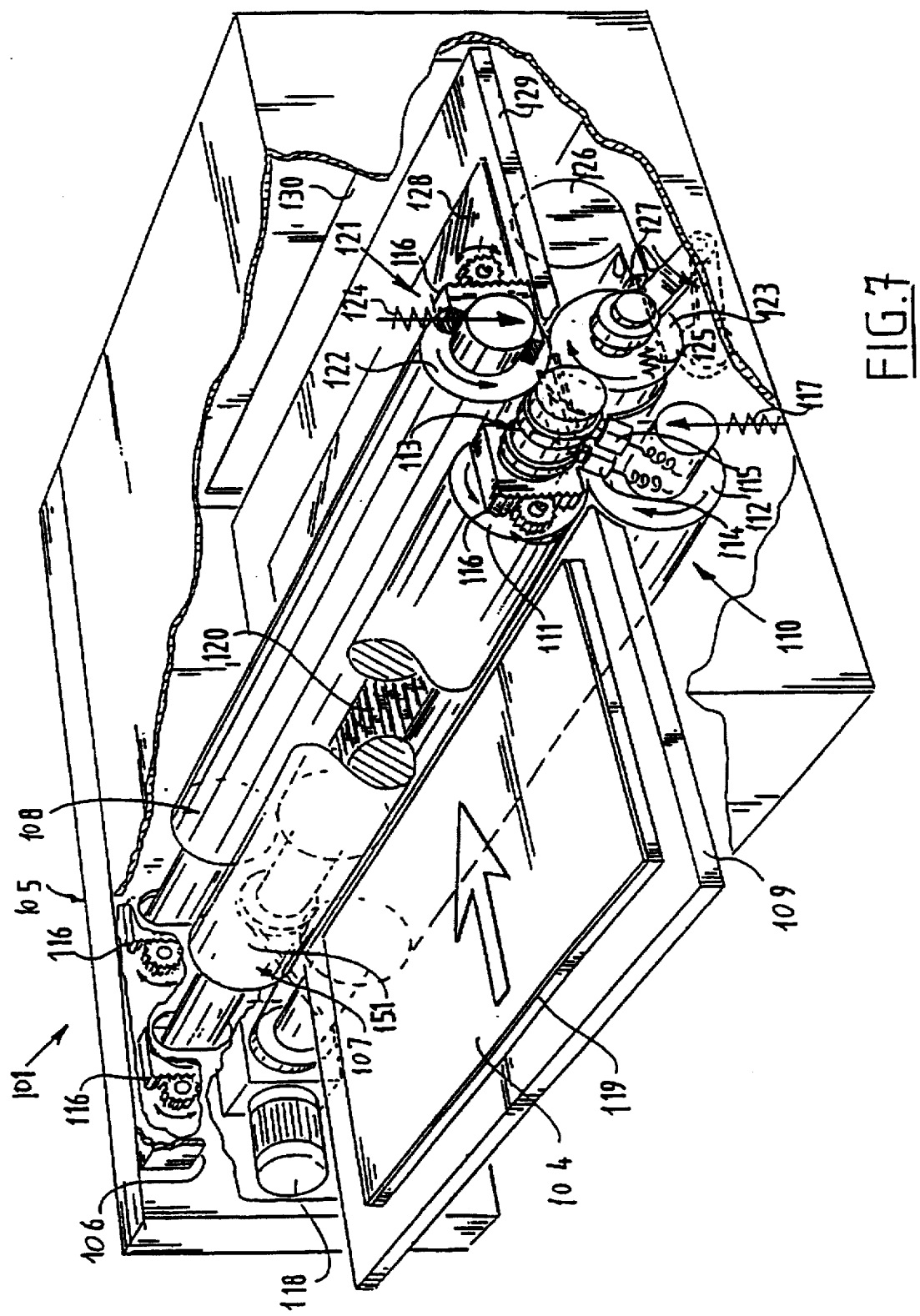
FIGS. 7–9 each show a perspective partly broken away schematic view of a device according to the invention, in each case for a different embodiment.

FIG. 7 shows a device 101 according to the invention for mounting and/or enclosing an illustration 104. The device 101 comprises a housing 105 with an inlet 106 and the mounting unit 107 and the enclosing unit 108 are accommodated in housing 105.

Via an entry table 109 the illustration 104 is supplied on a substrate 119 to the mounting unit 107. The latter comprises a covering roller pair 110 consisting of an upper covering roller 111 and a lower covering roller 112. The upper covering roller 111 is provided with heating means 113 and is provided for this purpose with two wiper contact connections 114 and 115.

The upper covering roller 111 is also provided with a height adjustment 116 whereby the distance between the covering rollers 111 and 112 can be adapted to the thickness of the illustration 104 and its substrate 119.

The lower covering roller 112 is under bias of spring means 117 and is driven using a motor 118. The enclosing unit 108 is reached via an intermediate table 120. The enclosing unit 108 comprises an enclosing roller pair 121 with an upper enclosing roller 122 and a lower enclosing roller 123. The upper enclosing roller 122 is height-adjustable by means of the height adjustment 116 and is under spring bias of spring means 124.

The lower enclosing roller 123 is provided with heating means 125 so that enclosing foil 127 supplied from a cassette 126 can be adhered against the underside of the illustration 104 or the substrate 119, if used. It is further possible that instead of the substrate 119 an illustration is used, while instead of the illustration 104 a mounting foil sheet is used so that the final product 128 consists of an illustration which is enclosed between two enclosing foils.

The product arrives on the end table 129 and leaves the device 101 via outlet 130.

The construction of cassette 126 is discussed in more detail above. Finally, it is noted that the lower enclosing roller 123 is driven by the motor 118 via a pulley 151.

Figure 8:
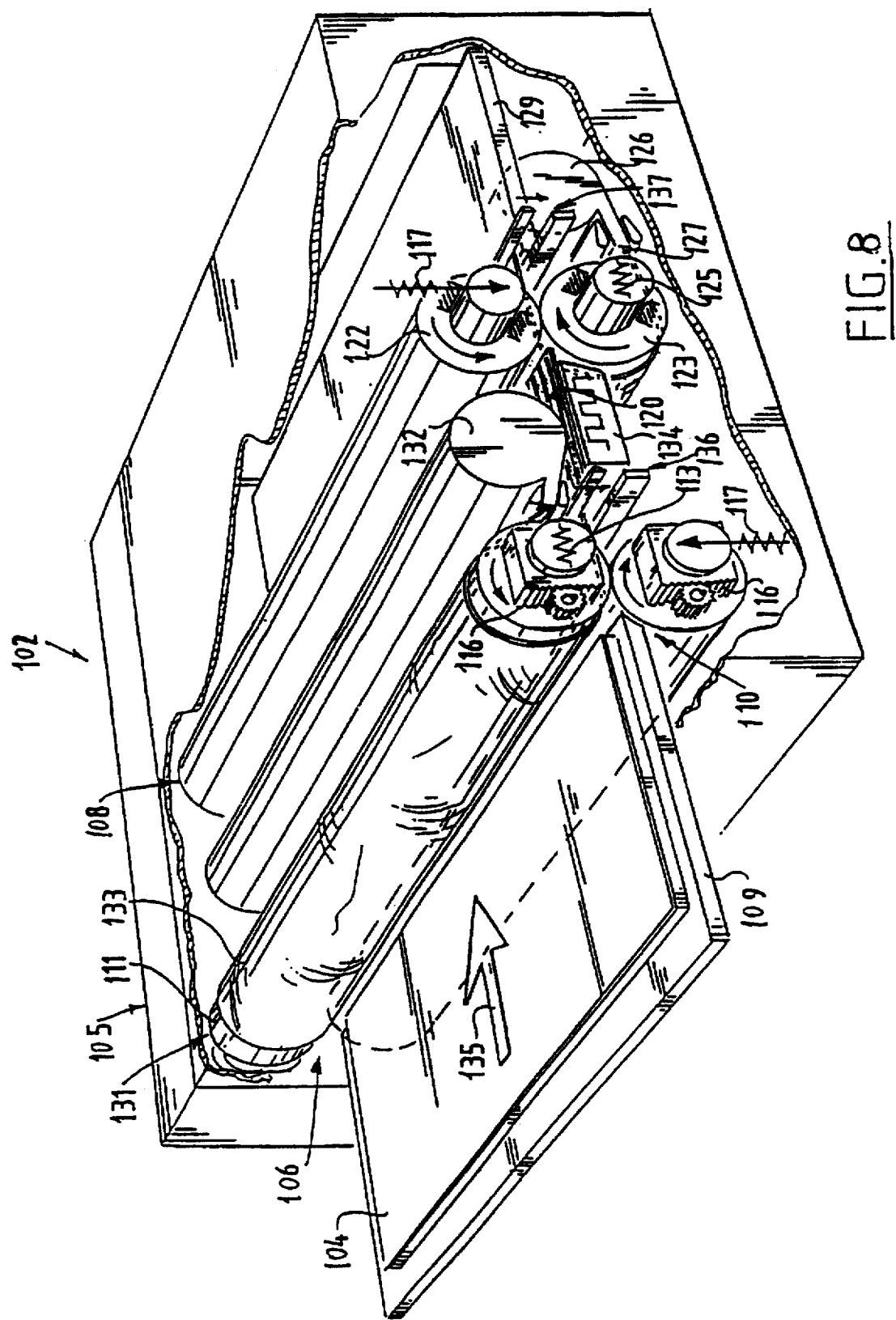

FIG. 8 shows a device 102 according to the invention likewise having accommodated in housing 105 a mounting/laminating unit 131 followed by an enclosing unit 108. In this case the upper covering roller 111 is followed by a cassette 132 from which foil 133 is supplied to the heated upper covering roller 111.

Conventional cooling means 134 are positioned on the underside of the intermediate table 120 in order, in the case of enclosing, to cool through the illustration 104 the foil 133 adhered to the illustration 104 prior, to supplying foil 127 from the cassette 126 in the following enclosing unit 108 from the lower heated enclosing roller 123.

The product for processing which follows an imaginary through-feed plane, which plane is substantially the plane passing between the entry table 109, the intermediate table 120 and the end table 129, can already be cut to size in the device 102 since cutting means 136 are located behind the mounting/laminating unit 131 in the processing direction (arrow 135) and cutting means 137 are located behind the enclosing unit 108 in the processing direction.

Figure 9:
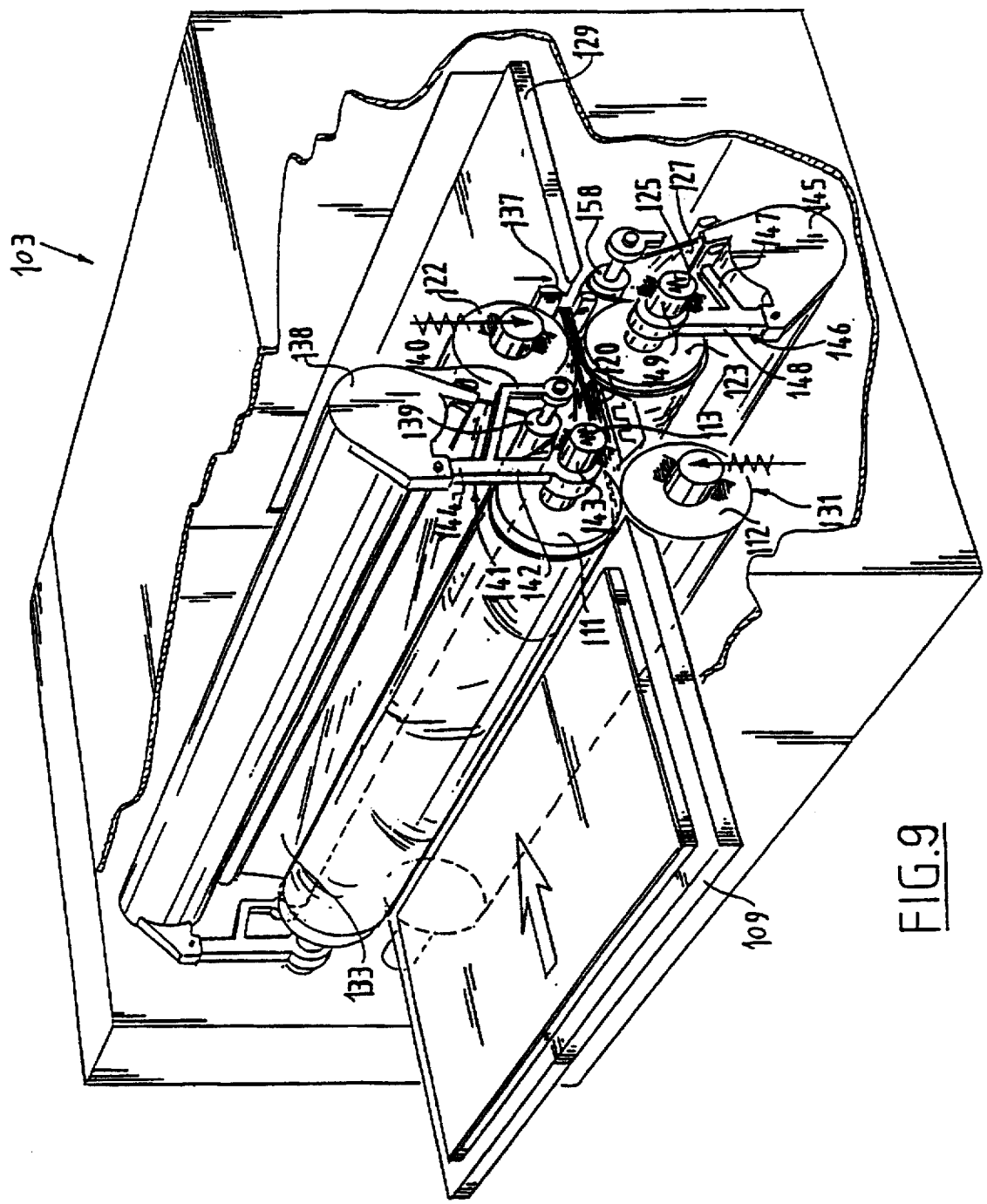

FIG. 9 shows a device 103 according to the invention having substantially the same construction as the device 102 of FIG. 8. In this case the cassette 138 for foil 133 is located at a greater distance from the through-feed plane, wherein the distance between the mounting/laminating unit 131 and the enclosing unit 108 is markedly smaller. This is achieved-in that the foil 133 is fed via a deflecting roller 139, the diameter Of which is considerably smaller than that of cassette 138. The deflecting roller is mounted in a leg 140 of fork 141, the other leg 142 of which pivots on the shaft stub 143 of the upper covering roller 111. Cassette 138 is fixed to the stem 144 of the fork 141.

The same construction is applied for the cassette 145 which is attached to the fork 146, a leg 147 of which mounts the deflecting roller 158 around which foil 127 is trained. The other leg 148 is pivotable on the shaft stub 149 of enclosing roller 123.

Finally following on the enclosing unit 108 are the cutting means 137 with which, in the case of enclosing, both outer foil layers 133 and 127 are simultaneously cut while enclosing the illustration.

If the device 103 is only used for mounting, the foil then has to be removed from the upper covering roller 111, while the lower enclosing roller 123 is swung out of the through-feed plane.

In the case of laminating only the lower enclosing roller 123 is swung aside as compared to FIG. 9.

Figure 10:
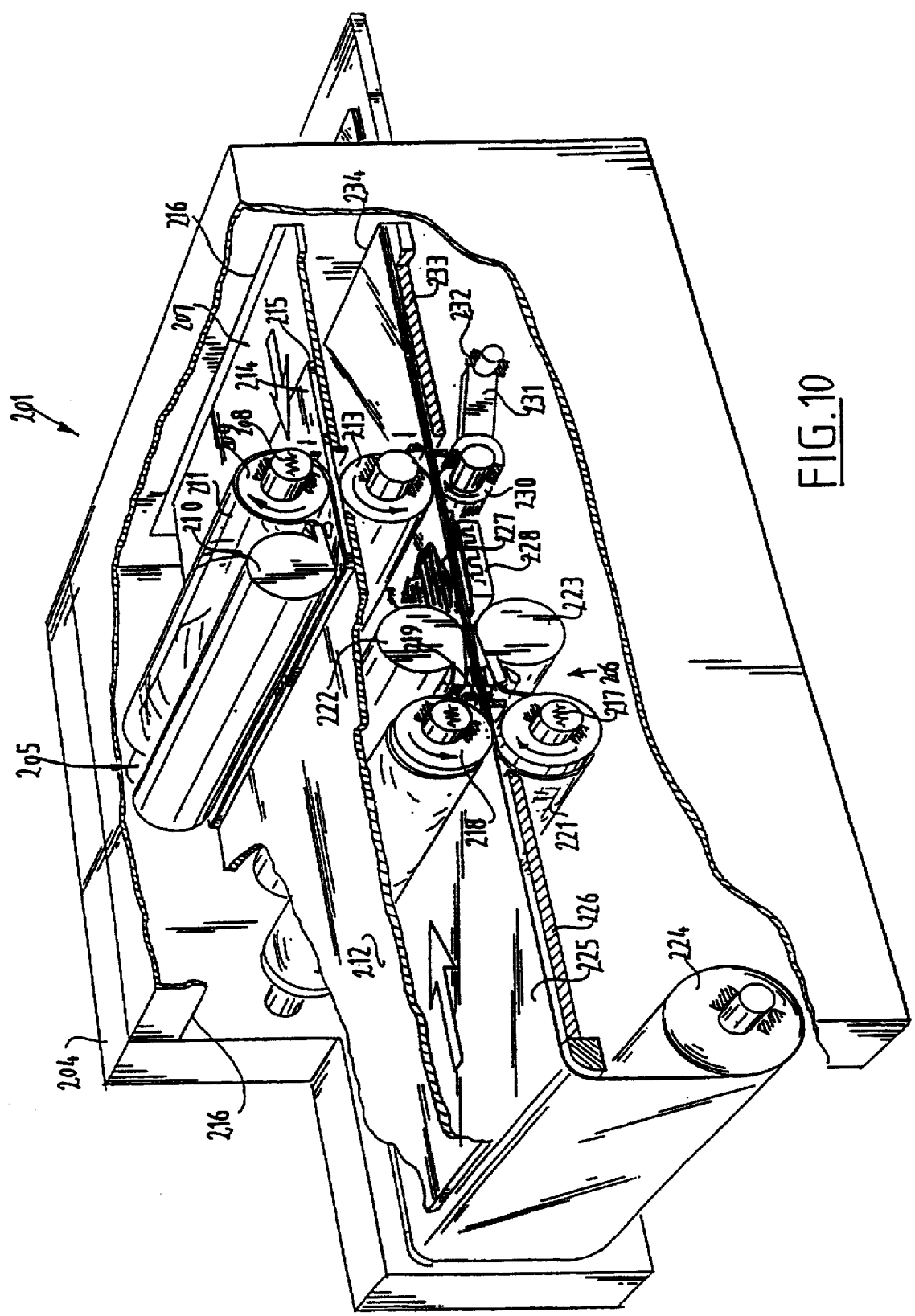
FIGS. 10–12 each show a perspective, partly broken away schematic view of a device according to the invention for mounting, laminating and/or enclosing an illustration.

FIG. 10 shows a device 201 according to the invention which comprises a housing 204 having accommodated therein a mounting/laminating unit 205 and an enclosing unit 206.

The mounting/laminating unit 205 comprises an entry table 207 and connecting thereto a covering roller 209 which is provided with heating means 208 and around which is guided a cover foil 211 supplied from a cassette 210. The construction of the cassette used is described above. The covering roller 209 forms a covering roller pair with covering roller 213.

In the mounting/laminating unit 205 an illustration 214 can be arranged on a substrate 215, while on the latter a cover foil 211 is arranged. The illustration 214 and the substrate 215 are fed via inlet 216 and leave the mounting/laminating unit 205 via the table 212 and the outlet 216. In the case only an illustration 214 has to be arranged on the substrate 215 the cover foil 211 can be removed from the covering roller 209.

The enclosing unit 206 is located at a lower level. The enclosing unit 206 comprises two enclosing rollers 218 and 219 which are provided with heating means 217 and around which are guided the enclosing foils 220 and 221 which are supplied from cassettes 222 and 223. The latter have the same construction as cassette 211. Enclosing foil 220, 221 is thus arranged on either side of an illustration sheet 225 which is supplied from a reel 224 and which arrives from the entry table 226 on the intermediate table 227 after passing through the covering rollers 220 and 221, which intermediate table, as shown, is provided on one side or on two sides with cooling means 228 for cooling the sheet.

After applying of the cover foils 220, 221 the illustration sheet 225 can, depending on the illustration, optionally be cut up using the cutting means 229.

The pair of stretching rollers is then passed, which pair consists of the above described covering roller 213 and the stretching roller 230. The latter is mounted in a crank 231 which is mounted in turn in a bearing 232, whereby the stretching roller 230 can be moved in and out of contact with the roller 213. After stretching the enclosed illustration arrives on a table 233 and leaves device 10 via the outlet 234.

It will be apparent that if the rollers 209, 213 and 230 operate at the same speed of revolution, mounting/laminating operations and enclosing operations can be performed simultaneously in the device 201 while making use of five rollers.

Figure 11:
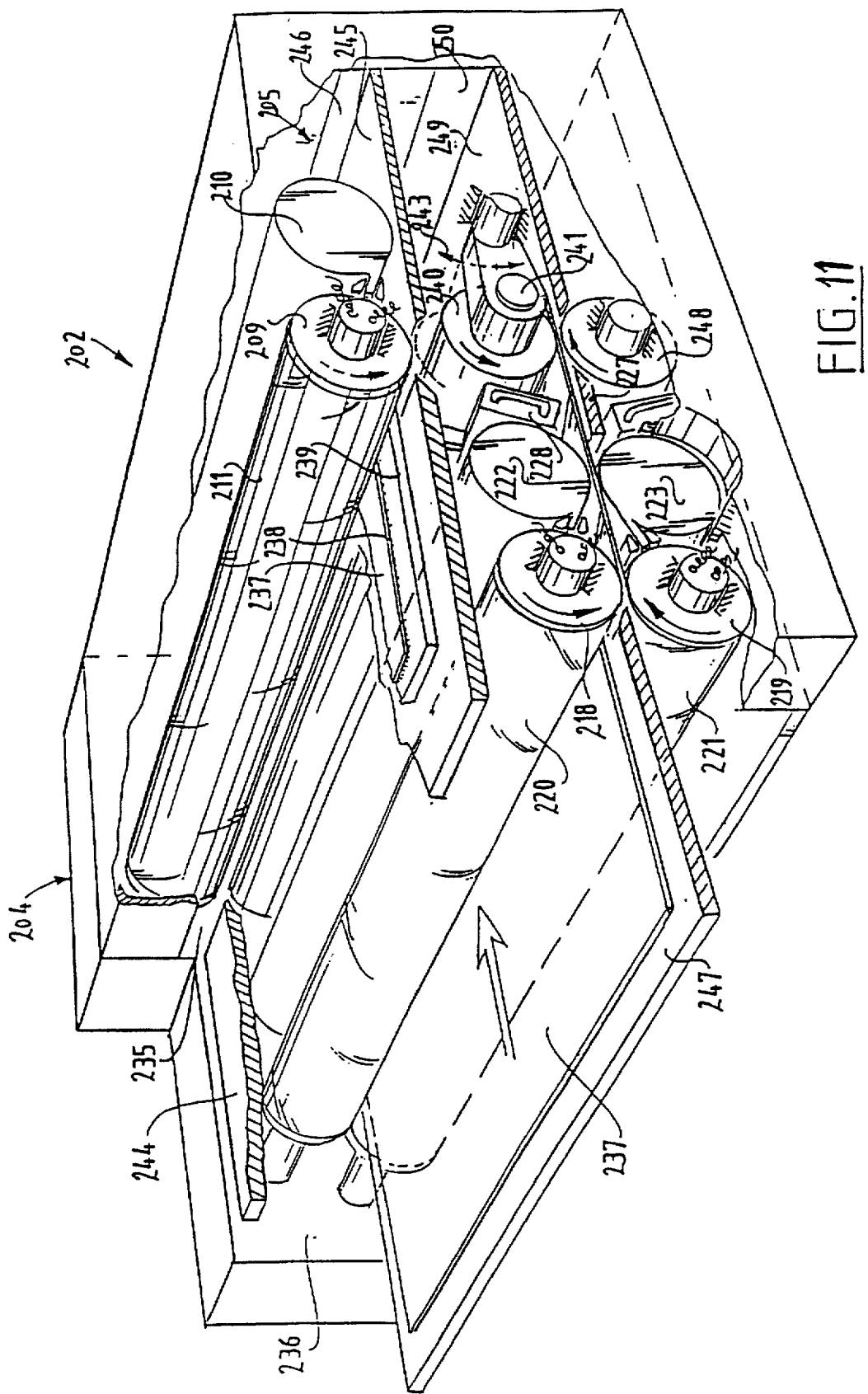

FIG. 11 shows the device 202 according to the invention having substantially the same construction as the device 201 of FIG. 10. In this case the mounting/laminating unit 205 and the enclosing unit 206 are also accommodated in the housing 204. In this case, however, the inlet 235 for the mounting/laminating unit 205 and the inlet 236 for the enclosing unit 206 are located on the same side of the housing 204.

An illustration 237 which must be arranged on a substrate 239 by-means of glue 238 passes through the covering rollers 209 and 240, wherein the covering roller 240 is mounted in a bearing 242 via a crank 241 and is pivotable as according to arrow 243. In the dashed line position the covering roller 240 is in active contact with covering roller 209, around which is trained the cover foil 211 coming from the cassette 210. The finished product supplied via table 244 leaves the device 202 via table 245 and via outlet 246.

In the enclosing unit 206 the illustration 237 is supplied via a table 247 and passes through both enclosing rollers 218 and 219 around which are trained the respective enclosing foils 220, 221 coming from the respective cassettes 222 and 223. Via the intermediate table 227, which is provided with cooling means 228 on both sides, the illustration provided on both sides with enclosing foil 220, 221 passes through the stretching rollers 240 and 248, wherein the stretching roller 240 also functions as covering roller when pivoted via arrow 234 to the dashed line position.

The enclosed illustration leaves the device 202 according to the invention via the table 249 and the outlet 250.

Figure 12:
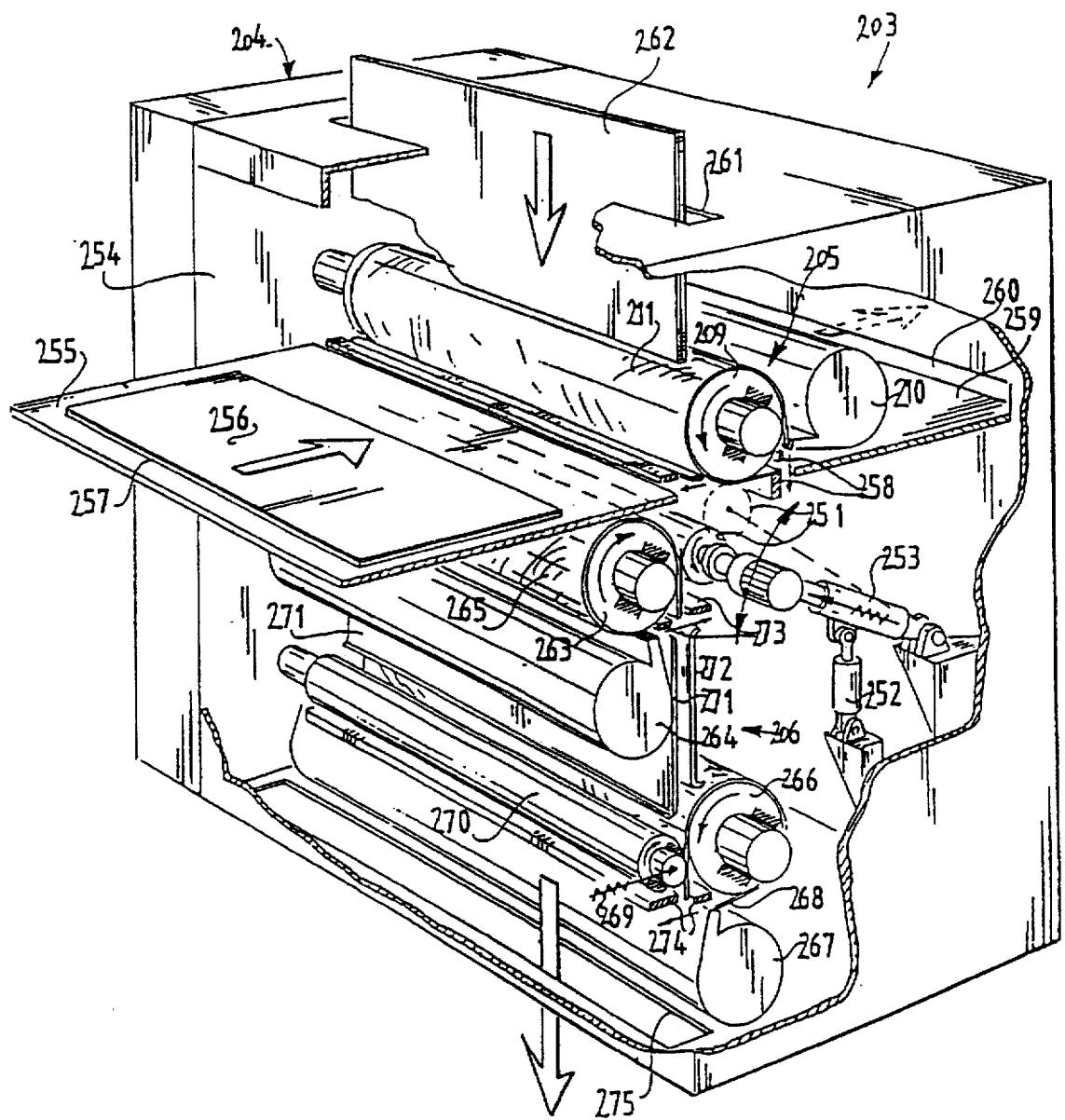

FIG. 12 finally describes another device according to the invention which likewise comprises a mounting/laminating unit 205 and an enclosing unit 206. The mounting/laminating unit 205 comprises the covering roller 209 having trained therearound cover foil 211 coming from cassette 210 and in addition a displaceable roller 251 which, using a piston 252 and a spring 253, is displaceable between the dashed line position and the full line position. In the dashed line position the roller 251 operates as covering roller and in the full line position as stretching roller.

Housing 204 is provided with a side entrance 254 with an entry table 255, whereby the illustration 256 placed on a substrate 257 can be guided through the mounting/laminating unit 205 and, after cutting of the cover foil 211 with the cutting means 258, can be discharged via table 259 and outlet 260.

Housing 204 is further provided with a top entrance 261 with which an illustration 262 can be fed to the enclosing unit 206. It is optionally possible to feed the illustration 262 via the side entrance, making use of a deflecting member rising at that moment from the table 255.

The enclosing unit 206 comprises an enclosing roller 63 which is provided with heating means (not shown) and around which is trained enclosing foil 265 coming from a cassette 264. The enclosing roller 263 co-acts (in the situation drawn in full lines) with the roller 251 which then serves as stretching roller. The supplied illustration 262 is then provided on the other side with enclosing foil when it passes over the enclosing roller 266 around which is trained enclosing foil 268 coming from a cassette 267. This enclosing roller 266 co-acts with a stretching roller 270 lying under spring bias of a spring 269.

Guiding of the hanging illustration 262 is provided by means of two vertical guide plates 271 and 272. Finally, cutting means 273 and 274 are provided for cutting off arranged foil 265 and 268 respectively.

The enclosed illustration 262 leaves the device 13 via the bottom outlet 275.

Figure 13:
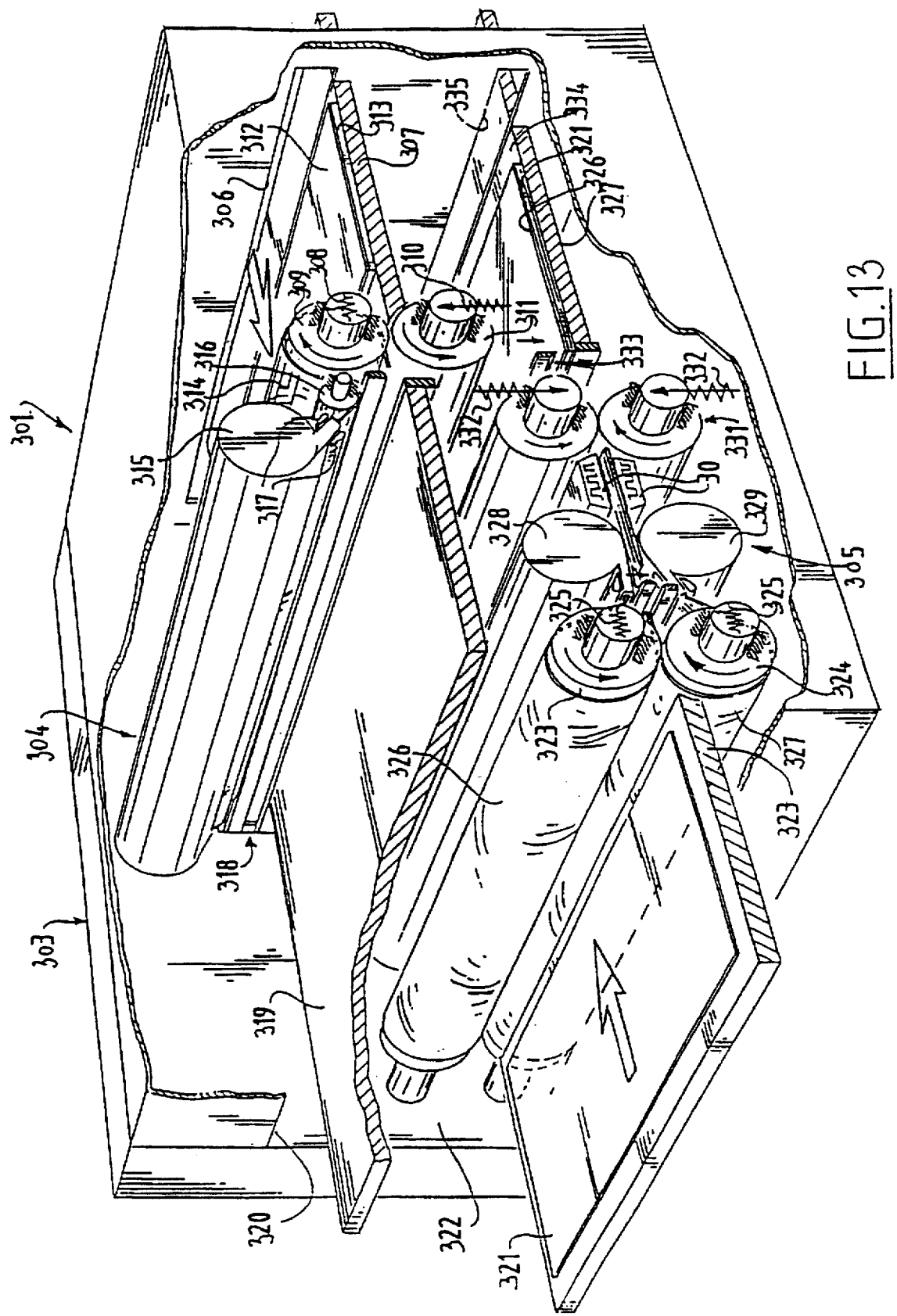
FIGS. 13 and 14 each show a perspective, partly broken away schematic view of devices according to the invention for mounting, laminating and/or enclosing an illustration.

FIG. 13 shows a device 301 according to the invention which comprises a housing 303 in which are accommodated a mounting and laminating unit 304 and an enclosing unit 305.

The mounting and laminating unit 304 is located at an upper level and is accessible via inlet 306 with the associated table 307.

The mounting/laminating unit 304 comprises an upper covering roller 309 provided with heating means 308 and lower covering roller 311 under spring bias of a spring 310. Covering roller 309 is adjustable in height direction subject to the thickness of the illustration 312 and/or the substrate 313.

Guided over the heated upper covering roller 309 is a cover foil 314 which is supplied from a cassette 315 and which is trained round a deflecting roller 316. The construction of the cassette 3$5 and the associated bending means 317 is described above.

Located closely behind the upper covering roller 309 in the processing direction are cutting means 318 for severing cover foil 314 arranged on the illustration 312. The mounting/laminating unit 304 is left via table 319 and therein passes the outlet 320.

In the case only mounting is being carried out, no foil 314 is trained round roller 309, although the glue adhesive is activated through the illustration 312 with the heated upper covering roller.

Situated at a lower level is the enclosing unit 305, the through-feed of which is in opposing direction, i.e. the illustration 321 for enclosing is introduced via the inlet 322 on the side of the housing 303 on which the outlet 320 also lies. From the entry table 323 the product reaches a pair of enclosing rollers 323 and 324 which are both provided with heating means 325.

An enclosing foil 326, 327 coming from the respective associated cassettes 328, 329 is trained round both rollers. These cassettes have substantially the same construction as the cassette 315 of the mounting/laminating unit. Cooling elements 330 follow in the through-feed direction on either side of the enclosed illustration 321, whereafter the whole entity passes through a pair of stretching rollers 331 both lying under bias of a spring 332. Cutting means 333 finally follow, whereafter the illustration enclosed between the foils 326 and 327 leave the device 13 via table 334 and outlet 335.

Figure 14:
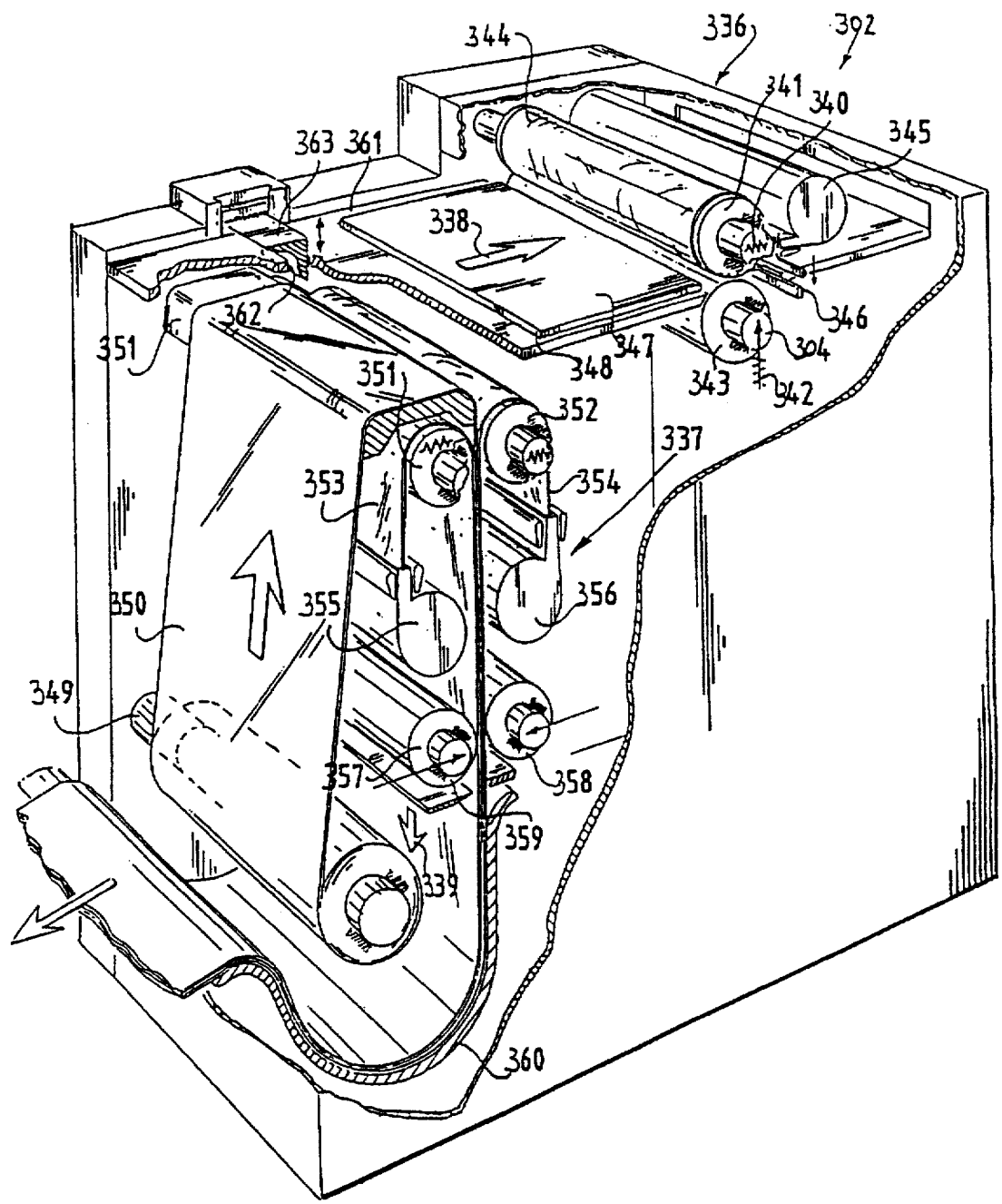

FIG. 14 shows a device 302 according to the invention which comprises a mounting/laminating unit 336 and an enclosing unit 337. The through-feed direction of mounting/laminating unit 336 is substantially horizontal (arrow 338) and of enclosing unit 337 substantially vertical (arrow 339).

The mounting/laminating unit comprises a covering roller 341 provided with heating means 340 and an associated lower covering roller 343 lying under spring bias of a spring 342. Cover foil 344 coming from cassette 345 is guided round the heated covering roller 341. Situated beneath cassette 345 are cutting means 346 for severing cover foil 344 after this has been arranged on the illustration 347 which is therein simultaneously arranged on the substrate 348 (laminating operation).

The enclosing unit 337 can be employed in two ways.

As shown, sheet-like illustrations 350 from a roll 349 are supplied over a table 351 and guided between heated enclosing rollers 351 and 352 around which is trained enclosing foil 353, 354 respectively, which foils come from the respective cassettes 355 and 356. The illustration sheet 350 enclosed between foils 353 and 354 subsequently pass through two stretching rollers 357 and 358 lying under spring bias and can be cut to size using the cutting means 359. The enclosed illustration sheet 350 leaves device 302 via the curved table 360.

For the second application method a slit 362 is present in the entry table 361 for the mounting/laminating unit 336 and in addition a deflecting member 363 which co-acts therewith and which can be placed outside of the table 61 so that illustrations supplied over table 361 can be deflected into the enclosing unit 337.

Figure 15:
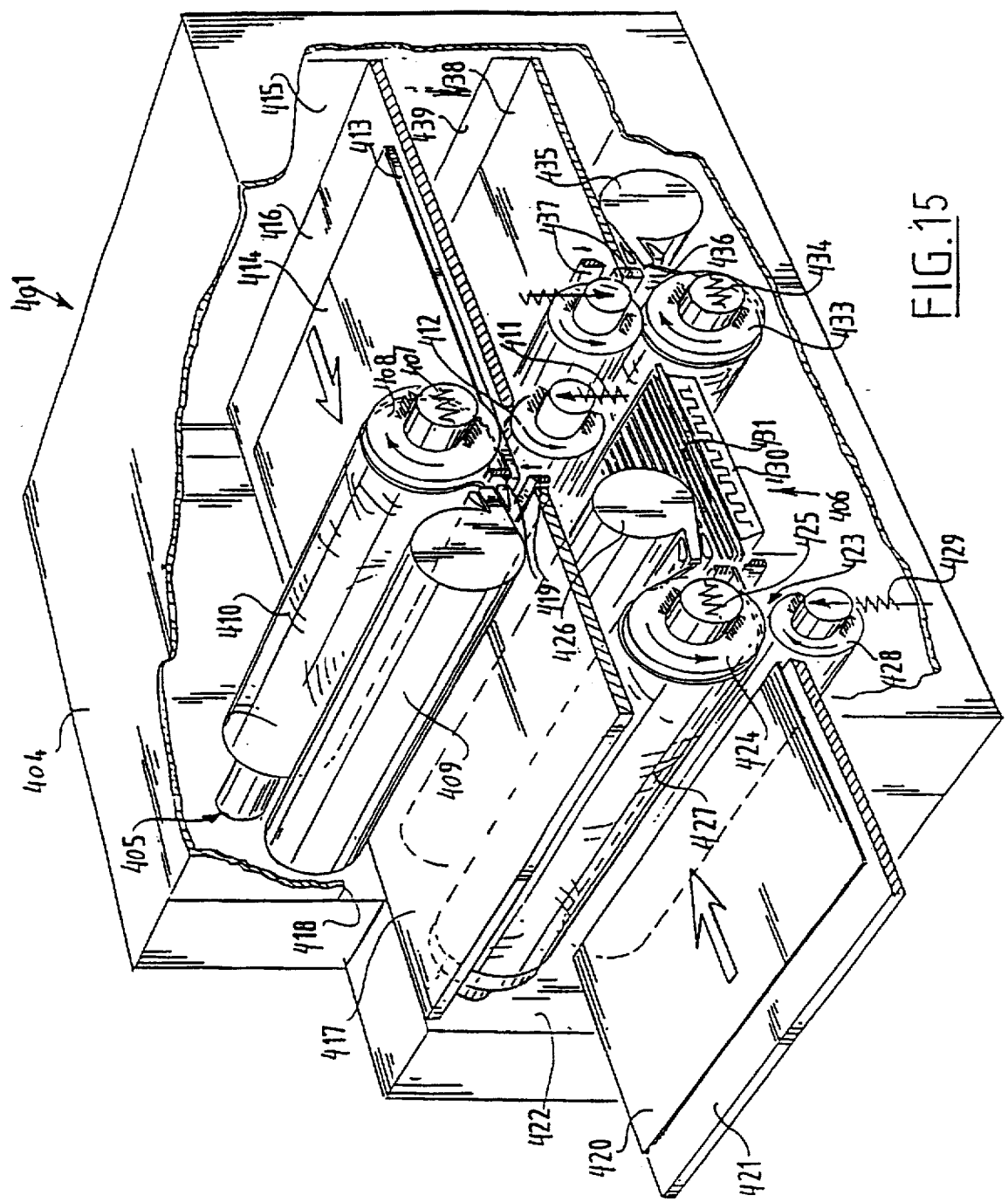
FIGS. 15–17 each show a perspective, partly broken away schematic view of a device according to the invention for mounting, laminating and/or enclosing an illustration.

FIG. 15 shows a device 401 according to the invention which comprises a housing 404 and accommodated in housing 404 a mounting/laminating unit 405 and an enclosing unit 406. The mounting/laminating unit 405 comprises a covering roller 408 which is provided with heating means 407 and around which is trained cover foil 410 coming from cassette 409. The construction of the cassette 409 is described above.

Covering roller 408 co-acts with an unheated covering roller 412 lying under spring bias of a spring 411.

An illustration 414 located on a substrate 413 is fed via the inlet 415, passes through the mounting/laminating unit 405 over table 416 and is discharged via the table 417 and outlet 418. The cover foil 410 is meanwhile severed with cutting means 419 located between both tables.

The enclosing unit 406 is accessible from the other side because the illustration 420 is supplied via table 421 and inlet 422.

The enclosing unit 406 comprises a first roller pair 423 consisting of an enclosing roller 424 which is provided with heating means 425 and around which is trained enclosing foil 427 coming from a cassette 426. The other roller 428 of roller pair 423 is a stretching roller which lies under spring bias of a spring 429.

Via an intermediate table 431 provided with cooling means 430 the illustration 420, which is provided on the upper side with enclosing foil 427, reaches the second roller pair 432 consisting of a lower enclosing roller 433 which is provided with heating means 434 and around which is trained enclosing foil 436 coming from a cassette 435. Using cutting means 437 the sheet of enclosing foil can be severed, whereafter the enclosed illustration leaves device 401 via table 438 and outlet 439.

Figure 16:
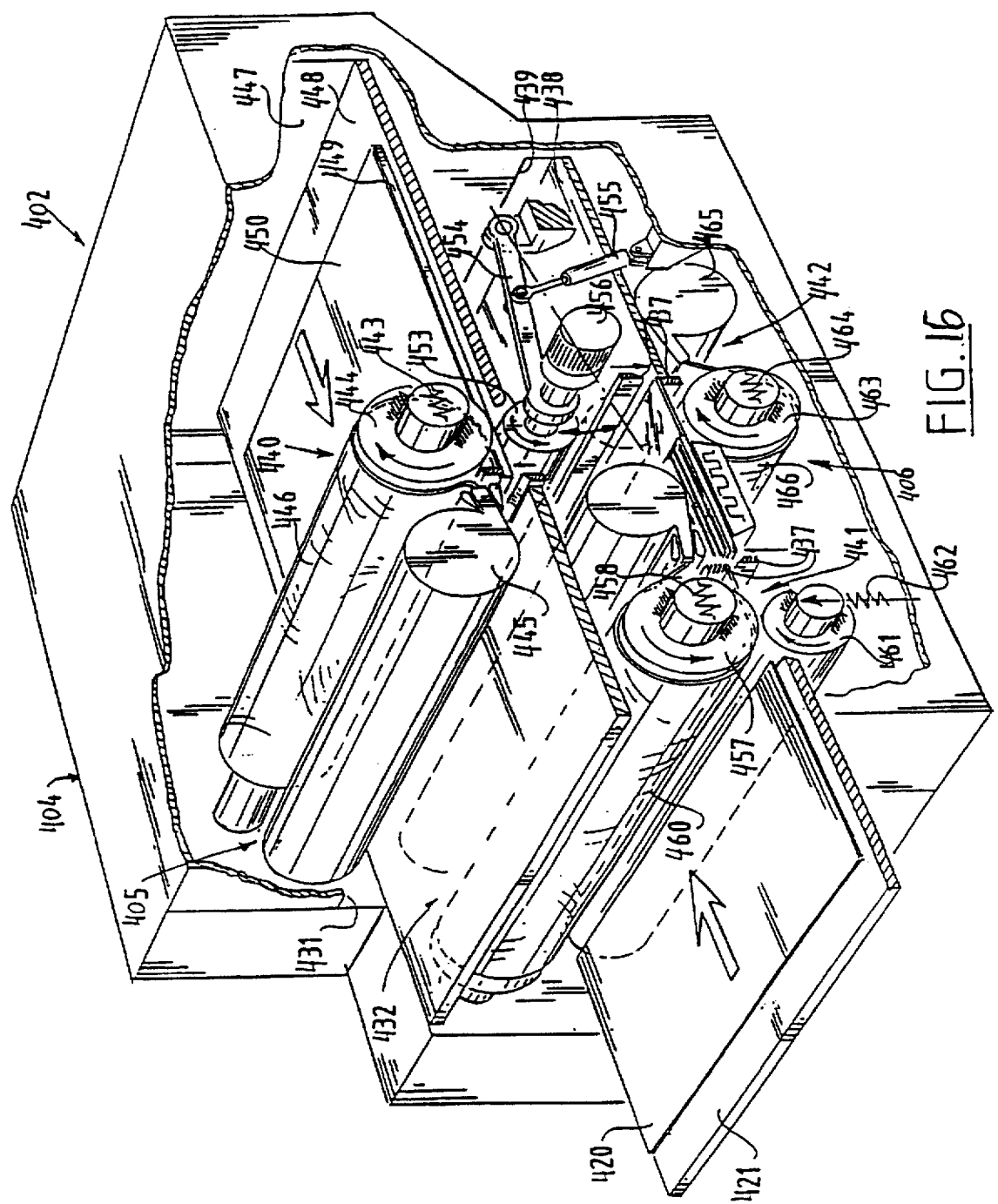

FIG. 16 shows a device 402 according to the invention in which once again housing 404 is provided with a mounting/laminating unit 405 and an enclosing unit 406. The mounting/laminating unit 405 comprises a roller pair 440 and the enclosing unit 406 comprises a roller pair 441 and a second roller pair 442.

The roller pair 440 is formed by a covering roller 444 which is provided with heating means 443 and around which is trained cover foil 446 coming from a cassette 445 such that via an inlet 447 over the table 448 an illustration 450 located on a substrate 449 can be enclosed. if only mounting is necessary, the cover foil 446 is then temporarily removed from covering roller 444. The finished product leaves the outlet 451 via the table 452.

The other roller of the roller pair 440 is formed by the displaceable roller 453 which is mounted on a frame 454 which can be controlled with the cylinder 455. Roller 453 is driven with the motor 456.

The roller pair 441 comprises an enclosing roller 457 which is provided with heating means 458 and around which is trained enclosing foil 460 coming from a cassette 459. This enclosing roller 457 co-acts with a stretching roller 461 under spring bias of a spring 462.

The roller pair 442 comprises a lower enclosing roller 463 which is provided with heating means 464 and around which is trained enclosing foil 466 coming from a cassette 465. The enclosing roller 463 also co-acts with the stretching roller 453 when this is displaced to the dashed line position by means of cylinder 455.

Using cutting means 437 the enclosing foils 460 and 466 can be severed. The illustration 420 can thus be enclosed by feeding via table 421 and discharge via table 438 and outlet 439.

Figure 17:
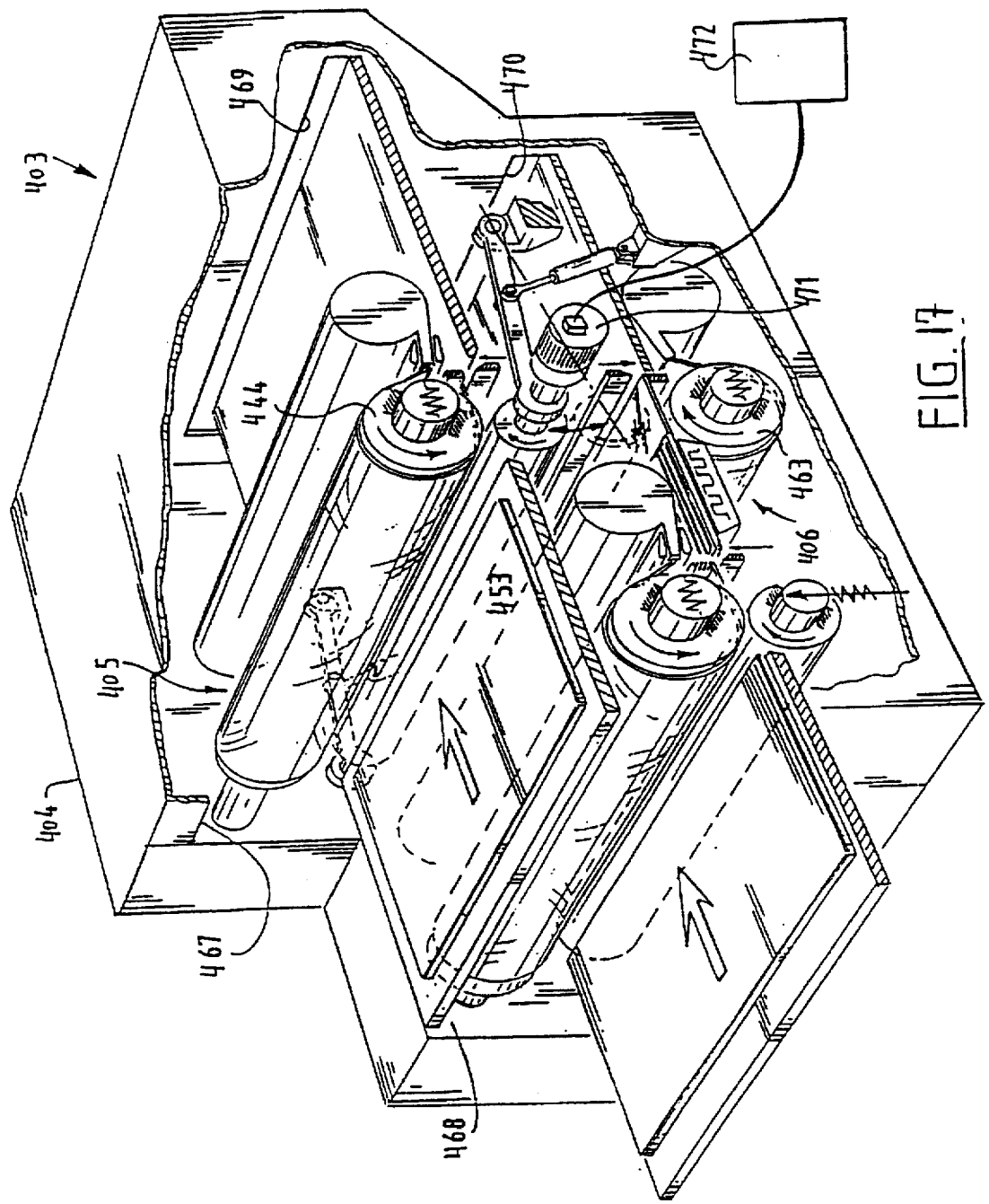

The device 403 shown in FIG. 17 displays great similarities with the device 402 of FIG. 16. The housing 404 is however provided with an inlet 467 for the mounting/laminating unit 405 and an inlet 468 for the enclosing unit 406 which are located on the same side. The respective Outlets therefore lie on the other side.

In this case the displaceable stretching roller 453 is provided with means 471 for reversing the rotation direction of roller 453, depending on its position which is detectable with the unit 472. If the roller 453 is in the position designated with full lines and co-acting with covering roller 444, the roller 453 then rotates clockwise, while in the dashed line position wherein it co-acts with enclosing roller 463, the rotation direction is reversed and is then counter-clockwise.

I claim:

1. A device for at least one of mounting, laminating and enclosing an illustration, comprising:
   a) a housing,
   b) a mounting and laminating unit having a covering roller pair including an upper covering roller and a lower covering roller and having a cover layer cassette providing a cover foil to at least one of the covering rollers and
   c) an enclosing unit having an enclosing roller pair including an upper enclosing roller and a lower enclosing roller, having two enclosing cassettes providing an enclosing foil for the respective enclosing rollers, and having a pair of stretching rollers for stretching therebetween the enclosing foils arranged on the illustration, wherein the mounting and laminating unit and the enclosing unit are located in the housing.

2. The device according to claim 1, further including an inlet for the mounting and the laminating unit and an inlet for the enclosing unit, wherein the inlets are accessible from one side of the housing.

3. The device as claimed in claim 1, wherein the mounting and laminating unit further comprises an entry table which connects onto an inlet for the mounting and laminating unit and which connects onto the covering roller pair for directing a cover foil to at least one of the covering rollers.

4. The device as claimed in claim 1, wherein the enclosing unit further comprises an entry table which connects onto an inlet for the enclosing unit and which connects onto an enclosing roller pair for directing an enclosing foil to the respective enclosing rollers.

5. The device as claimed in claim 1, wherein a roller is displaceable between the mounting and laminating unit and the enclosing unit and functions as a covering roller and as a stretching roller.

6. The device as claimed in claim 3, further including a pair of enclosing rollers and wherein the enclosing rollers and at least one of the covering rollers are provided with at least one of heating means and pressure means.

7. The device as claimed in claim 1, wherein the cassette has a cassette outlet which connects onto a roller point which lies along a roller surface at more than 200° from the entry table.

8. The device as claimed in claim 1, wherein the cassette is slidable via an infeed into a cassette holder.

9. The device as claimed in claim 1, wherein the cassette is provided with a stationary deflecting member.

10. The device as claimed in claim 1, wherein the cassette outlet has a curved form in a lengthwise direction.

11. The device as claimed in claim 10, wherein the housing is provided with bending means for bending the cassette outlet into the curved form.

12. The device as claimed in claim 7, wherein the cassette includes a foil having a scratch-sensitive layer and wherein the foil is rolled up in the cassette and is a laminate foil with the scratch-sensitive layer wound facing inward.

13. The device as claimed in claim 3, wherein at least one roller of the roller pair is mounted on a swing-away roller bracket.

14. The device according to claim 1, wherein the mounting and laminating unit and enclosing unit each comprise a pair of rollers located on either side of a through-feed plane along which the illustration passes, wherein at least one roller of each roller pair is a heated roller provided with heating means.

15. The device as claimed in claim 14, wherein the mounting and laminating unit comprises a covering roller pair with an upper covering roller and a lower covering roller and the upper covering roller is provided with the heating means.

16. The device as claimed in claim 14, wherein the enclosing unit comprises an enclosing roller pair with an upper enclosing roller and a lower enclosing roller and the lower enclosing roller is provided with the heating means.

17. The device as claimed in claim 14, wherein the enclosing rollers are adjustable relative to each other.

18. The device as claimed in claim 17, wherein the enclosing roller provided with the heating means is adjustable in and out of the through-feed plane.

19. The device as claimed in claim 14, wherein foil is supplied from a cassette to the heated roller and cutting means are located subsequent to this heated roller in a processing direction.

20. The device as claimed in claim 15, wherein cooling means are located subsequent to the covering roller pair in the processing direction.

21. The device as claimed in claim 14, wherein a cassette connects onto the roller provided with the heating means for supplying foil to this roller and the foil is guided round a deflecting roller.

22. The device as claimed in claim 21, wherein the cassette is fixed to the roller provided with the heating means and to the deflecting roller.

23. The device as claimed in claim 22, wherein the cassette is fixed to a fork coupled to the roller provided with the heating means and to the deflecting roller.

24. The device according to claim 1, wherein the mounting and laminating unit comprises a pair of covering rollers and the enclosing unit comprises two enclosing rollers and two stretching rollers and wherein at least one of the rollers is displaceable between the mounting and laminating unit and the enclosing unit.

25. The device as claimed in claim 24, wherein the displaceable roller is one of the two stretching rollers co-acting with another of the two stretching rollers.

26. The device as claimed in claim 25, wherein the displaceable stretching roller is displaceable between a position in which it makes contact with at least one of the covering rollers and a position in which it makes contact with the other stretching roller.

27. The device as claimed in claim 26, wherein the two stretching rollers include an upper stretching roller and a lower stretching roller and wherein the displaceable stretching roller is the upper stretching roller.

28. The device as claimed in claim 25, wherein the displaceable stretching roller is displaceable between a position in which it makes contact with the other stretching roller and another position in which it makes no contact with the other stretching roller.

29. The device as claimed in claim 28, wherein the two stretching rollers include an upper stretching roller and a lower stretching roller and wherein the displaceable stretching roller is the lower stretching roller.

30. The device as claimed in claim 24, wherein the stretching rollers each co-act with at least one of the enclosing rollers and wherein at least one of the stretching rollers is displaceable between a position in which it makes contact with at least one of the covering rollers and a position in which it makes contact with at least one of the enclosing rollers.

31. The device according to claim 1, wherein a through-feed direction of the mounting and laminating unit and a through-feed direction of the enclosing unit are at an angle relative to one another.

32. The device as claimed in claim 31, wherein both the through-feed directions are opposed.

33. The device as claimed in claim 31, wherein the through-feed directions lie transversely of each other.

34. The device as claimed in claim 33, wherein the through-feed direction of the mounting and laminating unit is substantially horizontal and the through-feed direction of the enclosing unit is substantially vertical.

35. The device according to claim 1, wherein the mounting and laminating unit and enclosing unit each comprise roller pairs which include a roller provided with heating means and a co-acting, unheated roller.

36. The device as claimed in claim 35, wherein the unheated roller is a roller which is displaceable between the roller pair of the mounting and laminating unit and of the enclosing unit.

37. The device as claimed in claim 36, wherein the displaceable roller functions as a covering roller in the mounting and laminating unit and as a stretching roller in the enclosing unit.

38. The device as claimed in claim 36, wherein the displaceable roller is provided with means for reversing the rotational direction of the roller.

39. The device as claimed in claim 4, wherein at least one of the roller pairs is mounted on a swing-away roller bracket.

* * * * *

UNITED STATES PATENT AND TRADEMARK OFFICE
CERTIFICATE OF CORRECTION

PATENT NO. : 5,735,997
DATED : April 7, 1998
INVENTOR(S) : Johannes Antonius Maria Reinders Page 1 of 2

It is certified that error appears in the above-identified patent and that said Letters Patent is hereby corrected as shown below:

Column 1 Line 47 "which arc" should read --which are--.

Column 1 Line 48 after "in principle" insert --known--.

Column 1 Line 50 "material is" should read --materials--.

Column 1 Line 53 "to the tale invention" should read --to the invention--.

Column 2 Line 23 "and-laminating" should read --and laminating--.

Column 3 Line 29 between "or" and "a" delete hyphen.

Column 3 Line 44 "Upper" should read --upper--.

Column 4 Line 38 after "means" delete comma and insert period --.--.

Column 4 Line 54 "one etc. etching" should read --one stretching--.

Column 6 Line 30 "device I" should read --device 1--.

Column 6 Line 33 after "enclosing unit" insert --6.--.

Column 6 Line 52 "toiler" should read --roller--.

Column 7 Line 17 after "cassette 17" delete comma and insert period --.--.

Column 7 Line 18 after "outlet 12" delete comma and insert period --.--.

UNITED STATES PATENT AND TRADEMARK OFFICE
CERTIFICATE OF CORRECTION

PATENT NO. : 5,735,997
DATED : April 7, 1998
INVENTOR(S) : Johannes Antonius Maria Reinders It is certified that error appears in the above-identified patent and that said Letters Patent is hereby corrected as shown below:

Column 7 Line 44 after "glue layer" insert --36--.

Column 7 Line 57 after "covering layer" insert --is--.

Column 7 Line 65 between "cassette" and "outlet" delete --35--.

Column 8 Line 25 "use Of" should read --use of--.

Column 9 Line 37 between "prior" and "to" delete comma --,--.

Column 9 Lines 54-55 between "achieved" and "in" delete hyphen.

Column 9 Line 56 "diameter Of" should read --diameter of--.

Column 11 Line 41 "roller 63" should read --roller 263--.

Column 12 Line 8 "cassette 3$5" should read --cassette 315--.

Column 13 Line 51 "which can he" should read --which can be--.

Column 14 Line 6 "Outlets" should read --outlets--.

Signed and Sealed this

Twenty-eighth Day of July, 1998

Attest:

BRUCE LEHMAN

*Attesting Officer*  *Commissioner of Patents and Trademarks*